United States Patent
Lee et al.

(10) Patent No.: US 10,952,224 B2
(45) Date of Patent: Mar. 16, 2021

(54) METHOD AND APPARATUS FOR TRANSMITTING AND RECEIVING SIGNALS ON BASIS OF COVERAGE CLASS IN COMMUNICATION SYSTEM

(71) Applicant: Samsung Electronics Co., Ltd., Suwon-si (KR)

(72) Inventors: Sung-Jin Lee, Bucheon-si (KR); Jung-Soo Jung, Seongnam-si (KR); Beom-Sik Bae, Suwon-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 576 days.

(21) Appl. No.: 15/566,917

(22) PCT Filed: Apr. 14, 2016

(86) PCT No.: PCT/KR2016/003904
§ 371 (c)(1),
(2) Date: Oct. 16, 2017

(87) PCT Pub. No.: WO2016/167578
PCT Pub. Date: Oct. 20, 2016

(65) Prior Publication Data
US 2018/0139760 A1    May 17, 2018

Related U.S. Application Data

(60) Provisional application No. 62/147,767, filed on Apr. 15, 2015.

(51) Int. Cl.
*H04W 72/08* (2009.01)
*H04W 68/02* (2009.01)
(Continued)

(52) U.S. Cl.
CPC ....... *H04W 72/08* (2013.01); *H04W 28/0268* (2013.01); *H04W 28/18* (2013.01);
(Continued)

(58) Field of Classification Search
CPC .............. H04W 72/08; H04W 72/048; H04W 28/0268; H04W 28/18; H04W 28/0236;
(Continued)

(56) References Cited

U.S. PATENT DOCUMENTS

| 6,546,255 B1 * | 4/2003 | Cerwall | H04W 68/06 340/7.21 |
| 2009/0002147 A1 * | 1/2009 | Bloebaum | H04M 1/72577 340/466 |

(Continued)

FOREIGN PATENT DOCUMENTS

| WO | 2006/073816 A2 | 7/2006 |
| WO | 2012/091478 A2 | 7/2012 |

(Continued)

OTHER PUBLICATIONS

3rd Generation Partnership Project; Technical Specification Group GSM/EDGE Radio Access Network; Cellular System Support for Ultra Low Complexity and Low Throughput Internet of Things; (Release 13), 3GPP TR 45.820, Mar. 2015, pp. 1-147, V1.0.1, Sophia-Antipolis, France.

(Continued)

*Primary Examiner* — Chi Tang P Cheng
(74) *Attorney, Agent, or Firm* — Jefferson IP Law, LLP

(57) ABSTRACT

An apparatus and a method for transmitting and receiving a signal based on a mobility coverage class are provided. The method includes the operations of receiving, from a base station, information for estimating mobility and information for determining whether to return to a first mode, determining whether the terminal has mobility based on the infor- (Continued)

mation for estimating mobility, entering a second mode in which a predetermined coverage class is switched to the mobility coverage class when it is determined that the terminal has mobility, transmitting, to the base station, a second mode indicator indicating entry into the second mode, selecting one of coverage classes of the base station as the mobility coverage class, and transmitting and receiving a signal using a resource allocated to the selected mobility coverage class.

19 Claims, 10 Drawing Sheets

(51) Int. Cl.
| | |
|---|---|
| *H04W 72/04* | (2009.01) |
| *H04W 28/02* | (2009.01) |
| *H04W 28/18* | (2009.01) |
| *H04W 8/08* | (2009.01) |
| *H04W 16/00* | (2009.01) |
| *H04W 4/70* | (2018.01) |
| *H04W 4/30* | (2018.01) |
| *H04W 8/22* | (2009.01) |

(52) U.S. Cl.
CPC ......... *H04W 68/02* (2013.01); *H04W 72/048* (2013.01); *H04W 4/30* (2018.02); *H04W 4/70* (2018.02); *H04W 8/08* (2013.01); *H04W 8/22* (2013.01); *H04W 16/00* (2013.01); *H04W 28/0236* (2013.01)

(58) Field of Classification Search
CPC ......... H04W 68/02; H04W 4/70; H04W 4/30; H04W 8/08; H04W 8/22; H04W 16/00
USPC ........................................................ 370/329
See application file for complete search history.

(56) References Cited

U.S. PATENT DOCUMENTS

| | | | |
|---|---|---|---|
| 2009/0052350 A1* | 2/2009 | Chen ..................... | H04W 24/02 370/255 |
| 2010/0159927 A1* | 6/2010 | Toda ..................... | H04W 48/16 455/435.2 |
| 2011/0019629 A1* | 1/2011 | De Pasquale ........ | H04B 7/0689 370/329 |
| 2011/0263274 A1* | 10/2011 | Fox ....................... | H04W 60/00 455/456.2 |
| 2013/0324182 A1 | 12/2013 | Deng et al. | |
| 2014/0071957 A1 | 3/2014 | Xu et al. | |
| 2017/0290054 A1* | 10/2017 | Zhao ................... | H04W 74/006 |

FOREIGN PATENT DOCUMENTS

| | | |
|---|---|---|
| WO | 2012/121566 A2 | 9/2012 |
| WO | 2013/113365 A1 | 8/2013 |

OTHER PUBLICATIONS

International Search Report dated Jul. 26, 2016, issued in International Application No. PCT/KR2016/003904.

\* cited by examiner

METHOD AND APPARATUS FOR TRANSMITTING AND RECEIVING SIGNALS ON BASIS OF COVERAGE CLASS IN COMMUNICATION SYSTEM

CROSS-REFERENCE TO RELATED APPLICATION(S)

This application is a U.S. National Stage application under 35 U.S.C. § 371 of an International application filed on Apr. 14, 2016 and assigned application number PCT/KR2016/003904, which claimed the benefit of a U.S. Provisional application filed on Apr. 15, 2015 in the U.S. Patent and Trademark Office and assigned Ser. No. 62/147,767, the entire disclosures of each of which are hereby incorporated by reference

TECHNICAL FIELD

The present disclosure relates to a method and apparatus for transmitting and receiving a signal based on a coverage class in a communication system.

BACKGROUND

The Internet is evolving from a human-oriented connection network, in which humans generate and consume information, to the internet of things (IoT), in which distributed elements, such as objects and the like, exchange and process information. internet-of-everything (IoE) technology may be an example in which the IoT technology is combined with big-data processing technology through a connection with a cloud server or the like.

In order to implement IoT, technical factors such as a sensing technique, wired/wireless communication and network infrastructure, service interface technology, and security technology are required, and thus research is being conducted on a sensor network, machine to machine (M2M), machine type communication (MTC), and the like for connection between objects.

In the IoT environment, through collection and analysis of data generated from connected objects, an intelligent internet technology (IT) service capable of creating new value in peoples' lives may be provided. IoT may be applied to fields such as a smart home, a smart building, a smart city, a smart car or connected car, a smart grid, health care, smart home appliances, or high-tech medical service, through the convergence of the conventional information technology (IT) with various industries.

Cellular IoT (CIoT) technology, in which IoT technology is applied to a cellular communication system, may be used for a smart city, a smart farm, a smart factory, and the like. In this instance, generated CIOT traffic may have the following features. That is, CIoT traffic mainly includes traffic associated with an uplink report that reports the monitoring result to a base station, and most CIoT traffic may correspond to small packets having a size less than or equal to 200 bytes. Also, CIoT traffic is reported to a base station hourly, as a short interval, or daily, as a long interval. Therefore, CIoT traffic may have a traffic interval that is relatively longer than other traffic.

However, with growing interest in a smart city, a smart farm, a smart factory, or the like, the performance that users require from CIoT technology is also increasing. In other words, users require CIoT terminals that consume a small amount of power such that the CIoT terminals have extended lifetimes, and also demand long-distance services and/or underground services of CIoT traffic. Also, users require large numbers of connections so that CIoT technology can be provided to a number of CIoT terminals ranging from tens of thousands thereof to millions thereof in each cell.

Therefore, there is demand for a method for satisfying the performance that users require from the CIoT technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting and receiving a signal based on a mobility coverage class in a communication system.

Another aspect of the present disclosure is to provide a method and an apparatus for updating a coverage class in a communication system.

Another aspect of the present disclosure is to provide a method and an apparatus for transmitting and receiving a signal based on resource allocation information, which is changed according to coverage class update, in a communication system.

Also, an embodiment of the present disclosure is to provide a method and an apparatus for transmitting and receiving a signal based on resource allocation information associated with subdivided coverage classes for a static terminal in a communication system.

Also, an embodiment of the present disclosure is to provide a method and apparatus for transmitting and receiving a signal using an underloaded coverage class resource by a terminal included in an overloaded coverage class in a communication system.

In accordance with an aspect of the present disclosure, a method of transmitting and receiving a signal based on a mobility coverage class by a connected terminal in a communication system is provided. The method includes: receiving, from a base station, information for estimating mobility and information for determining whether to return to a normal mode; determining whether the connected terminal has mobility based on the information for estimating mobility; when it is determined that the connected terminal has mobility, entering a mobility mode that switches a predetermined coverage class to a mobility coverage class, and transmitting, to the base station, a mobility mode indicator indicating entry into the mobility mode; selecting one of coverage classes of the base station as the mobility coverage class; and transmitting and receiving a signal using a resource allocated to the selected mobility coverage class.

In accordance with another aspect of the present disclosure, a method of transmitting and receiving a signal based on a mobility coverage class by an idle terminal in a communication system is provided. The method includes receiving, from a base station, information for estimating mobility and information for determining whether to return to a normal mode; determining whether the idle terminal has mobility based on the information for estimating mobility; when it is determined that the terminal has mobility, entering a mobility mode that switches a predetermined coverage class to a mobility coverage class, and transmitting, to the base station, a mobility mode indicator indicating entry into the mobility mode; selecting one of coverage classes of the base station as the mobility coverage class; and receiving a paging message transmitted from the base station using a resource allocated to the mobility coverage class, and transmitting a paging response in response to the paging message using a resource allocated to the mobility coverage class.

In accordance with another aspect of the present disclosure, a method of updating a coverage class by a terminal in a communication is provided. The method includes checking whether pathloss values measured with respect to medium coverage classes between coverage class 1, having a lowest pathloss value, and coverage class N, having a highest pathloss value, and a pathloss value measured with respect to coverage class N, among base station coverage classes determined based on a pathloss value, which is an attenuation value of a downlink reference signal, are greater than or equal to the sum of a predetermined threshold value and a margin value; and when a pathloss value is greater than or equal to the sum of the predetermined threshold value and the margin value, updating a related coverage class to a higher coverage class having a relatively higher pathloss value.

In accordance with another aspect of the present disclosure, a method of transmitting and receiving a signal based on a coverage class by a terminal in a communication system is provided. The method includes receiving a reference signal from a base station, and measuring a pathloss value, which is an attenuation value of the reference signal; calculating a difference between the measured pathloss value and a pathloss value of a coverage class to which the terminal belongs and transmitting information associated with the calculated difference to the base station; receiving, from the base station, resource allocation information changed based on the difference; and transmitting and receiving a signal based on the received resource allocation information.

In accordance with another aspect of the present disclosure, a method of transmitting and receiving a signal based on a coverage class by a base station in a communication system is provided. The method includes: transmitting a reference signal to a terminal; receiving, from the terminal, information associated with a difference between a pathloss value measured based on the reference signal and a pathloss value of the coverage class to which the terminal belongs; changing resource allocation information associated with the terminal based on the difference; and transmitting the changed resource allocation information to the terminal and transmitting and receiving a signal based on the changed resource allocation information.

In accordance with another aspect of the present disclosure, a method of transmitting and receiving a signal based on a coverage class by a terminal in a communication system is provided. The method includes: determining whether the terminal is a static terminal based on information for determining a static terminal received from a base station; when it is determined that the terminal is a static terminal, requesting the base station to subdivide existing coverage classes; receiving resource allocation information for each of coverage classes subdivided from the existing coverage classes; and transmitting and receiving a signal based on the received resource allocation information.

In accordance with another aspect of the present disclosure, a method of transmitting and receiving a signal based on a load of each of coverage classes by a base station in a communication system is provided. The method includes: determining whether each of the coverage classes is overloaded or underloaded; selecting a terminal to be handed over to an underloaded coverage class from among terminals belonging to an overloaded coverage class according to the result obtained from the determination; transmitting, to the selected terminal, resource allocation information associated with the underloaded coverage class; and transmitting and receiving a signal based on the resource allocation information.

In accordance with an aspect of the present disclosure, a connected terminal that transmits and receives a signal based on a mobility coverage class in a communication system is provided. The connected terminal includes: a receiver that receives information for estimating mobility and information for determining whether to return to a normal mode from a base station, and receives a signal using resources allocated to a mobility coverage class; a controller that determines whether the connected terminal has mobility based on the information for estimating mobility, and selects one of the coverage classes of the base station as the mobility coverage class; and a transmitter that transmits a mobility mode indicator indicating that the connected terminal enters a mobility mode after the connected terminal enters the mobility mode in which a predetermined coverage class is switched to the mobility coverage class, when it is determined that the connected terminal has mobility.

In accordance with another aspect of the present disclosure, an idle terminal that transmits and receives a signal based on a mobility coverage class in a communication system is provided. The idle terminal includes a receiver that receives information for estimating mobility and information for determining whether to return to a normal mode, and receives a paging message transmitted from the base station using a resource allocated to a mobility coverage class; a controller that determines whether the idle terminal has mobility based on the information for estimating mobility, and selects one of the coverage classes of the base station as the mobility coverage class; and a transmitter that transmits, to the base station, a mobility mode indicator indicating that the terminal enters the mobility mode after the terminal enters the mobility mode in which a predetermined coverage class is switched to the mobility coverage class, when it is determined that the terminal has mobility, and transmits a paging response message using a resource allocated to the mobility coverage class in response to the paging message.

In accordance with another aspect of the present disclosure, a terminal that updates a coverage class in a communication system is provided. The terminal includes: a controller that checks whether pathloss values measured with respect to medium coverage classes between coverage class 1, having a lowest pathloss value, and coverage class N, having a highest pathloss value, and a pathloss value measured with respect to coverage class N among base station coverage classes determined based on a pathloss value, which is an attenuation value of a downlink reference signal, are greater than or equal to the sum of a predetermined threshold value and a margin value, and when a pathloss value is greater than or equal to the sum of the predetermined threshold value and the margin value, updates a related coverage class to a higher coverage class having a relatively higher pathloss value; a transmitter that transmits messages related to the controller; and a receiver that receives a message related to the controller.

In accordance with another aspect of the present disclosure, a terminal that transmits and receives a signal based on a coverage class in a communication system is provided. The terminal includes a receiver that receives a reference signal from a base station, receives resource allocation information changed based on a difference between a pathloss value measured based on the reference signal and a pathloss value of a coverage class to which the terminal belongs from the base station, and receives a signal based on the changed resource allocation information; a controller that measures a pathloss value, which is an attenuation value of the reference signal, and calculates a difference; and a transmitter that transmits information associated with the calculated difference to the base station.

In accordance with another aspect of the present disclosure, a base station that transmits and receives a signal based on a coverage class in a communication system is provided. The base station includes a receiver that receives information associated with a difference between a pathloss value measured based on a reference signal and a pathloss value of a coverage class to which the terminal belongs; a controller that changes resource allocation information associated with the terminal based on the difference; and a transmitter that transmits the reference signal to the terminal, transmits the changed resource allocation information to the terminal, and transmits a signal based on the changed resource allocation information.

In accordance with another aspect of the present disclosure, a terminal that transmits and receives a signal based on a coverage class in a communication system is provided. The terminal includes a controller that determines whether the terminal is a static terminal based on information for determining a static terminal received from a base station; a transmitter that requests the base station to subdivide existing coverage classes when it is determined that the terminal is a static terminal; and reception that receives resource allocation information associated with coverage classes subdivided compared with the existing coverage, and receives a signal based on the received resource allocation information.

In accordance with another aspect of the present disclosure, a base station that transmits and receives a signal based on a load of each coverage class in a communication system is provided. The base station includes a controller that determines whether each of the coverage classes is overloaded or underloaded, and selects a terminal to be handed over to an underloaded coverage class from among terminals belonging to an overloaded coverage class; and a transmitter that transmits resource allocation information associated with the underloaded coverage class to the selected terminal and transmits a signal based on the resource allocation information.

In accordance with another aspect of the present disclosure a method of transmitting and receiving a signal based on a mobility coverage class by a terminal is provided. The method includes receiving, from a base station, information for estimating mobility and information for determining whether to return to a first mode; determining whether the terminal has mobility based on the information for estimating mobility; entering a second mode in which a predetermined coverage class is switched to the mobility coverage class when it is determined that the terminal has mobility; transmitting, to the base station, a second mode indicator indicating entry into the second mode; selecting one of coverage classes of the base station as the mobility coverage class; and transmitting and receiving a signal using a resource allocated to the selected mobility coverage class.

In accordance with another aspect of the present disclosure a method of updating a coverage class by a terminal is provided. The method includes checking whether a pathloss value measured with respect to intermediate coverage class between coverage class 1, having a lowest pathloss value, and coverage class N, having a highest pathloss value, among base station coverage classes determined based on a pathloss value, which is an attenuation value of a downlink reference signal, the coverage class N are greater than or equal to a sum of a predetermined threshold value and a margin value; and updating a related coverage class to a higher coverage class having a relatively higher pathloss value when the pathloss value is greater than or equal to the sum of the predetermined threshold value and the margin value.

In accordance with another aspect of the present disclosure a method of transmitting and receiving a signal based on a coverage class by a terminal is provided. The method includes receiving a reference signal from a base station; obtaining a pathloss value, which is an attenuation value of the reference signal; obtaining a difference value between the measured pathloss value and a pathloss value of a coverage class to which the terminal belongs; transmitting information associated with the difference value to the base station; receiving, from the base station, resource allocation information changed based on the difference value; and transmitting and receiving a signal based on the received resource allocation information.

In accordance with another aspect of the present disclosure a method of transmitting and receiving a signal based on a coverage class by a base station is provided. The method includes transmitting a reference signal to a terminal; receiving, from the terminal, information associated with a difference value between a pathloss value obtained based on the reference signal and a pathloss value of a coverage class to which the terminal belongs; changing resource allocation information associated with the terminal based on the difference value; transmitting the changed resource allocation information to the terminal; and transmitting and receiving a signal based on the changed resource allocation information.

In accordance with another aspect of the present disclosure a method of transmitting and receiving a signal based on a coverage class by a terminal is provided. The method includes determining whether the terminal is a static terminal based on information for determining a static terminal received from a base station; requesting the base station to subdivide existing coverage classes when it is determined that the terminal is a static terminal; receiving resource allocation information for each of coverage classes which are subdivided from the existing coverage classes; and transmitting and receiving a signal based on the received resource allocation information.

In accordance with another aspect of the present disclosure a method of transmitting and receiving a signal based on a load of each of coverage classes by a base station is provided. The method includes determining whether each of the coverage classes is overloaded or underloaded; selecting a terminal to be handed over to an underloaded coverage class from among terminals belonging to an overloaded coverage class according to a result obtained from the determination; transmitting, to the selected terminal, resource allocation information associated with the underloaded coverage class; and transmitting and receiving a signal based on the resource allocation information.

In accordance with another aspect of the present disclosure a terminal that transmits and receives a signal based on a mobility coverage class is provided. The terminal includes a transceiver; and at least one processor configured to control the transceiver to receive, from a base station, information for estimating mobility and information for determining whether to return to a first mode, determine whether the terminal has mobility based on the information for estimating mobility, enter a second mode in which a predetermined coverage class is switched to the mobility coverage class when it is determined that the terminal has mobility, control the transceiver to transmit, to the base station, a second mode indicator indicating entry into the second mode, select one of coverage classes of the base station as the mobility coverage class, and control the transceiver to transmit and receive a signal using a resource allocated to the selected mobility coverage class.

In accordance with another aspect of the present disclosure a terminal that updates a coverage class is provided. The terminal includes a transceiver; and at least one processor configured to: check whether a pathloss value measured with respect to intermediate coverage class between coverage class 1, having a lowest pathloss value, and coverage class N, having a highest pathloss value, among base station coverage classes determined based on a pathloss value, which is an attenuation value of a downlink reference signal, or the coverage class N are greater than or equal to a sum of a predetermined threshold value and a margin value; and update a related coverage class to a higher coverage class having a relatively higher pathloss value when the pathloss value is greater than or equal to the sum of the predetermined threshold value and the margin value.

In accordance with another aspect of the present disclosure a terminal that transmits and receives a signal based on a coverage class is provided. The terminal includes a transceiver; and at least one processor configured to: control the transceiver to receive a reference signal from a base station, obtaining a pathloss value, which is an attenuation value of the reference signal, obtaining a difference value between the measured pathloss value and a pathloss value of a coverage class to which the terminal belongs, and control the transceiver to: transmit information associated with the difference value to the base station, receive, from the base station, resource allocation information changed based on the difference value; and transmit and receive a signal based on the received resource allocation information.

In accordance with another aspect of the present disclosure a base station that transmits and receives a signal based on a coverage class is provided. The base station includes a transceiver; and at least one processor configured to: control the transceiver to transmit a reference signal to a terminal and receive, from the terminal, information associated with a difference value between a pathloss value obtained based on the reference signal and a pathloss value of a coverage class to which the terminal belongs, change resource allocation information associated with the terminal based on the difference value, and control the transceiver to: transmit the changed resource allocation information to the terminal, and transmit and receive a signal based on the changed resource allocation information.

In accordance with another aspect of the present disclosure a terminal that transmits and receives a signal based on a coverage class is provided. The terminal includes a transceiver; and at least one processor configured to: determine whether the terminal is a static terminal based on information for determining a static terminal received from a base station, request the base station to subdivide existing coverage classes when it is determined that the terminal is a static terminal; and control the transceiver to: receive resource allocation information for each of coverage classes which are subdivided from the existing coverage classes, and transmit and receive a signal based on the received resource allocation information.

In accordance with another aspect of the present disclosure a base station that transmits and receives a signal based on a load of each of coverage classes is provided. The base station includes a transceiver; and at least one processor configured to: determine whether each of the coverage classes is overloaded or underloaded, select a terminal to be handed over to an underloaded coverage class from among terminals belonging to an overloaded coverage class according to a result obtained from the determination, and control the transceiver to: transmit, to the selected terminal, resource allocation information associated with the underloaded coverage class, and transmit and receive a signal based on the resource allocation information.

Other aspects, advantages, and salient features of the disclosure will become apparent to those skilled in the art from the following detailed description, which, taken in conjunction with the disclosure annexed drawings, discloses various embodiments of the present disclosure.

An embodiment of the present disclosure can transmit and receive a signal based on a mobility coverage class in a communication system.

Also, an embodiment of the present disclosure can effectively update a coverage class in a communication system.

Also, an embodiment of the present disclosure can transmit and receive a signal based on resource allocation information, which is changed according to coverage class update in a communication system.

Also, an embodiment of the present disclosure can transmit and receive a signal based on resource allocation information for coverage classes subdivided for a static terminal in a communication system.

Also, an embodiment of the present disclosure can allow a terminal included in an overloaded coverage class to transmit and receive a signal using an underloaded coverage class resource in a communication system.

BRIEF DESCRIPTION OF DRAWINGS

The above and other aspects, features, and advantages, according to specific exemplary embodiments of the present disclosure, will be more apparent from the following description taken in conjunction with the accompanying drawings, in which.

It should be noted that like reference numerals are used for illustrating the same or similar elements, features, and structures throughout the above drawings.

Figure 1:
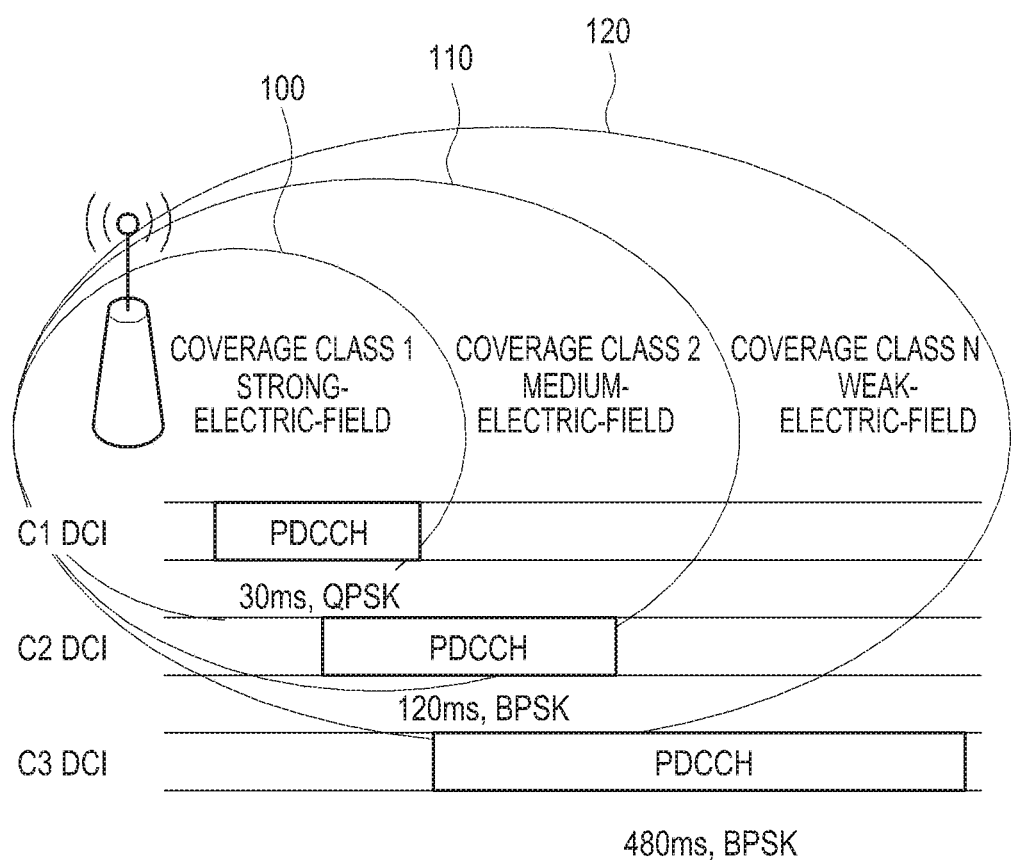
FIG. 1 is a diagram illustrating an example of division of base station coverage into a plurality of coverage classes in a normal communication system.

Detailed Description of DisclosureHereinafter, embodiments of the present disclosure will be described in detail with reference to the accompanying drawings.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" plural referents unless the context clearly dictates otherwise. Thus, for example, reference to "a component surface" includes reference to one or more of such surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items. The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, operations, elements, and/or components, but do not preclude the presence or addition of one or more other features, integers, operations, operations, elements, components, and/or groups thereof. Unless otherwise defined in connection with embodiments of the present disclosure, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to various embodiments of the present disclosure, an electronic device may include communication functionality. For example, the electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an a moving picture experts group (MPEG-1 or MPEG-2) audio layer 3 (MP3) player, a mobile medical device, a camera, and a wearable device (e.g., a head-mounted device (HMD), electronic clothes, an electronic bracelet, an electronic necklace, an electronic appcessory, an electronic tattoo, a smart watch, and the like).

Also, according to various embodiments of the present disclosure, an electronic device may include a smart home appliance having communication functionality. For example, the smart home appliance may be a television (TV), a digital versatile disc (DVD) player, an audio player, a refrigerator, an air conditioner, a vacuum cleaner, an oven, a microwave oven, a washer, a dryer, an air cleaner, a set-top box, a television (TV) box (e.g., Samsung HomeSync™, Apple TV™, or Google TV™), a gaming console, an electronic dictionary, a camcorder, an electronic picture frame, and the like.

Also, according to various embodiments of the present disclosure, an electronic device may include a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a voyage electronic device, an sailing electronic device (e.g., a sailing navigation device, a gyroscope, or a compass), an aviation electronic device, a security device, a robot for home or industry, and the like.

According to various embodiments of the present disclosure, the electronic device may be a combination of the above-mentioned devices. Further, it will be apparent to those skilled in the art that the electronic device according to various embodiments of the present disclosure is not limited to the above-mentioned devices.

According to various embodiments of the present disclosure, the terminal may be, e.g., an electronic device. Methods and apparatuses as proposed according to embodiments of the present disclosure may apply to various communication systems, including institute of electrical and electronics engineers (IEEE) 802 communication systems, IEEE 802.16 communication systems, digital multimedia broadcasting (DMB) services, digital video broadcasting-handheld (DVP-H) and advanced television systems committee-mobile/handheld (ATSC-M/H) services or other mobile broadcasting services, internet protocol television (IPTV) services or other digital video broadcasting systems, moving picture experts group (MPEG) media transport (MMT) systems, evolved packet systems (EPSs), long-term evolution (LTE)

mobile communication systems, LTE-advanced (LTE-A) mobile communication systems, high speed downlink packet access (HSDPA) mobile communication systems, high speed uplink (UL) packet access (HSUPA) mobile communication systems, 3rd generation project partnership 2 (3GPP2) high rate packet data (HRPD) mobile communication systems, 3GPP2 wideband code division multiple access (WCDMA) mobile communication systems, 3GPP2 code division multiple access (CDMA) mobile communication systems, mobile internet protocol (Mobile IP) systems, or so.

Hereinafter, according to the present disclosure, there are proposed methods and apparatuses for transmitting and receiving a signal based on a coverage class in a communication system.

FIG. 1 is a diagram illustrating an example of division of a base station coverage into a plurality of coverage classes in a normal communication system.

Referring to FIG. 1, a base station coverage includes N coverage classes, and each of the coverage classes may be determined based on a pathloss value, which is the attenuation value of a reference signal between a base station and a terminal. For example, an area in which the pathloss value of a reference signal transmitted by a base station is in the range of 0 dB to 144 dB may be determined as coverage class 1. An area having a pathloss value in the range of 145 dB to 154 dB may be determined as coverage class 2. An area having a pathloss value in the range of 155 dB to 164 dB may be determined as coverage class 3.

Each coverage class is assigned an independent control channel, for example, a physical downlink control channel (PDCCH), and may also be assigned an optimal transmission/reception resource.

Also, a coverage class corresponding to an area close to a base station is a strong-electric-field area and has a smaller number of repetitive transmissions than that of a coverage class corresponding to an area far from the base station. A coverage class corresponding an area far from the base station is a weak-electric-field area and has a large number of repetitive transmission. In FIG. 1, a strong-electric-field area 100 corresponding to coverage class 1 is assigned a parameter of 30 ms, which is a parameter associated with the number of repetitive transmissions, and the quadrature phase shift keying (QPSK) modulation scheme. A middle-electric-field area 110 corresponding to coverage class 2 is assigned a parameter of 120 ms, which is a parameter associated with the number of repetitive transmissions, and the binary phase shift keying (BPSK) modulation scheme. A weak-electric-field area 120 corresponding to coverage class N is assigned a parameter of 480 ms, which is a parameter associated with the number of repetitive transmissions, and the BPSK modulation scheme.

When it is assumed that a terminal is moving in a base station coverage area which is divided into a plurality of coverage classes, the terminal needs to transmit uplink feedback indicating that a coverage class has been changed in order to update a coverage class every time that a coverage class corresponding to an area to which the terminal belongs is changed, and also needs to perform network registration. However, the uplink feedback transmission and the network registration increase the terminal's uplink traffic, and this acts as a serious power consumption factor.

Also, an idle-state terminal may transmit a paging message based on a maximum coverage class (max) in order to avoid coverage class update. However, the load attributable to the paging message may increase. Particularly, when a paging message is transmitted based on an ultra-weak-electric-field-coverage class, the amount of power consumed increases due to excessive retransmission, whereby the lifetime of the terminal is shortened, which is a drawback.

Hereinafter, embodiments of the present disclosure will define a mobility class that is to be applied to a moving terminal in order to decrease the amount of power consumed by coverage class update, as described above. The mobility class is selected from among coverage classes which distinguish a base station coverage based on a pathloss value of a reference signal, and the selection is made based on one of the select options described as follows:

Select option 1: select based on the average value, the maximum value, or other operations of coverage class values applied to a related terminal during a predetermined period of time. For example, when it is assumed that the coverage class values applied to the related terminal during a predetermined period of time are 1,1,3,1,2,3,2,2,1, and 2, the mobility class may be selected to be 3, which is the maximum value among the coverage class values.

Select option 2: select based on a signal quality value measured by a related terminal during a predetermined period of time, for example, the maximum value from among pathloss values or a value obtained by adding a predetermined margin to the maximum value. For example, when it is assumed that the maximum value from among measured pathloss values is 144 dB, the mobility class may be selected based on 146 dB, which is obtained by adding a margin of 2 dB to 144 dB.

Select option 3: select based on a value that a base station directly sets in consideration of a control channel load and the coverage class of a related terminal.

Select option 4: select based on a combination of select option 1 to select option 3.

The mobility class is selected when a terminal enters a mobility mode, and whether the terminal enters the mobility mode is determined based on the mobility of the terminal. Here, the mobility of the terminal is determined based on mobility determination options described as follows, and when at least one of the mobility determination options is satisfied, it is determined that the terminal has mobility. Also, when it is determined that the terminal has mobility, the corresponding terminal enters a mobility mode, and select the mobility class of the corresponding terminal in consideration of select options 1 to 4.

Mobility determination option 1: when the number of coverage class updates of a related terminal (or the number of times that the related terminal performs coverage class adaptation) during a predetermined period of time is greater than or equal to a predetermined threshold value, it is determined that the related terminal has mobility. For example, when it is assumed that coverage class values applied to a related terminal during a predetermined period of time are 1,1,3,1,2,3, and 2 and that a predetermined threshold value is 5, the number of times that the related terminal updates a coverage class is 5, which is greater than or equal to the predetermined threshold value, whereby it is determined that the related terminal has mobility.

Mobility determination option 2: when the number of times that a related terminal reselects a cell during a predetermined period of time is greater than or equal to a predetermined threshold value, it is determined that the related terminal has mobility.

Mobility determination option 3: when variation in a coverage class of a related terminal and/or variation in the signal quality measured by the related terminal during a predetermined period of time is greater than or equal to a predetermined threshold value, it is determined that the related terminal has mobility.

Mobility determination option 4: when variation in at least one of other statistical values associated with a related terminal during a predetermined period of time is greater than or equal to a predetermined threshold value, it is determined that the related terminal has mobility. Here, the other statistical values may include, for example, an average value, a variance, and a standard deviation, or the like of synchronization signal received power (SSRP), reference signal received quality (RSRQ), reference signal received power (RSRP), and a received signal strength indicator (RSSI).

Mobility determination option 5: determine that a related terminal has mobility based on the service scenario of the related terminal, a request from the related terminal, and/or a setting directly set by a base station.

Mobility determination option 6: determine that a related terminal has mobility based on a combination of mobility determination options 1 to 5.

In this instance, mobility determination options 1 to 4 may define a mobility level through multiple steps, that is, two or more steps, by applying a plurality of threshold values.

Also, when a terminal which has entered a mobility mode determines that the terminal does not have mobility, the terminal may return to a previous mode, that is, a normal mode in which an existing coverage class, instead of the mobility class, is applied, and the condition for the terminal to return to the normal mode corresponds to the return condition options described as follows: That is, when at least one of the described return condition options is satisfied, a related terminal returns to a normal mode.

Return condition option 1: when a measured coverage class value is higher than a currently set mobility class value, a related terminal returns to a normal mode for a reliability issue.

Return condition option 2: when a difference between a measured coverage class value during a predetermined period of time and a set mobility class value is greater than or equal to a predetermined threshold value, and the difference is repeated at least a predetermined number of times, a related terminal returns to a normal mode. For example, on the assumption that a coverage class value measured by a terminal is 2 and a set mobility class value is 4 and that the difference between the two values is greater than or equal to a predetermined threshold value, when the difference is contiguously or discontiguously repeated at least a predetermined number of times, a related terminal returns to a normal mode in consideration of energy conservation.

Return condition option 3: when a malfunction of the reception operation of a related terminal is detected during a predetermined period of time, a related terminal returns to a normal mode. For example, when a decoding error for a packet of a predetermined control channel or data channels is repeated at least a predetermined number of times, the related terminal returns to a normal mode.

Return condition option 4: when at least one of SSRP, RSRQ, RSRP, and RSSI of a serving cell, measured by a related terminal during a predetermined period of time, is less than or equal to or greater than or equal to a predetermined threshold value, the related terminal returns to a normal mode.

Return condition option 5: the related terminal determines to return to a normal mode based on a determination made by a base station. That is, when a control channel load of the base station increases, the related terminal returns to a normal mode.

Return condition option 6: In the interests of reliability or energy conservation, the related terminal returns to a normal mode based on a combination of return condition options 1 to 5.

A terminal may be categorized as either a connected-state terminal or an idle-state terminal, and a coverage class management method in consideration of the mobility of each of the connected-state terminal and the idle-state terminal is as follows.

First, a coverage class management method determined in consideration of the mobility of a connected-state terminal will be described.

The connected-state terminal determines whether the terminal has mobility based on the above-described mobility determination options 1 to 6. Also, when it is determined that the connected-state terminal has mobility, the connected-state terminal enters a mobility mode and reports the same to a base station. Subsequently, the terminal selects a mobility class of the terminal based on the above-described select options 1 to 4. The mobility determination options 1 to 6 and the select options 1 to 4 have been described above, and thus detailed descriptions thereof will be omitted.

In this instance, as a mobility class is selected, multiple pieces of advance resource allocation information related to the mobility class may be changed at the same time. Here, the advance resource allocation information may be downlink control information (DCI), and may include, for example, a multi-channel integration (MCI) index, a DCI channel index, a DCI interval, and other DCI-resource-allocation-related parameters.

Also, when many antennas and beams are used, related terminals and base stations may configure radio resources based on one of the following options or a combination of two or more thereof.

1. configured to use a predetermined beam pair
2. configured to use a predetermined Tx beam
3. configured to use a predetermined Rx beam
4. configured to use predetermined frequency and time resources
5. configured to use one of a logical channel, a transport channel, and a physical channel
6. configured to use a predetermined resource configuration classification classified in advance Also, changing a coverage class based on mobility may be also applicable to power control and link adaptation. For example, when a highest mobility class is selected as the mobility class of a terminal, the terminal may perform power control or link adaptation based on a cell edge.

The radio resources configured by the related terminal and base station is available during a predetermined period of time set by the base station, and information indicating the predetermined period of time is shared with the terminal through a broadcasting channel signal transmitted from the base station, for example, system information, or may be transferred to the terminal through a dedicated channel signal transmitted from the base station. The dedicated channel signal includes, for example, a radio resource control (RRC) connection release message, an RRC connection reconfiguration message, an RRC connection establishment setup message, an RRC connection reestablishment setup message, an RRC connection resume setup message, and the like.

Also, when 3 GPP GERAN (GSM(global system for mobile communications) EDGE(enhanced data rates for GSM evolution) radio access network) CIoT NB-M2M (narrow band-machine to machine) is applied, the mobility mode of a terminal may be determined based on information received through information block 1 of a physical broadcast and synchronization channel (PBSCH) or through information blocks 2, 3, and 4 of an extended physical broadcast channel (EPBCH), or based on information received through DCI of a physical downlink shared channel (PDSCH).

Also, an RRC connection resume setup message, or the like when a 3GPP radio access network (RAN) is applied, the mobility mode of a terminal may be determined based on information shared through a broadcasting channel signal, for example, system information, transmitted in advance from the base station, or information transferred to the terminal through a dedicated channel signal, for example, an RRC connection release message, an RRC connection reconfiguration message, an RRC connection establishment setup message, an RRC connection reestablishment setup message.

Also, when terminals that have entered the mobility mode determine that the terminals has no mobility, the terminals return to a previous mode, that is, a normal mode, and informs a base station thereof. That is, the terminals that have entered the mobility mode determine whether to return to a normal mode based on the above-described return condition options 1 to 6. The return condition options 1 to 6 have already been described, and thus, detailed descriptions thereof will be omitted. In this instance, when a terminal returns to a normal mode, the terminal may perform an initial cell selection process.

Figure 2:
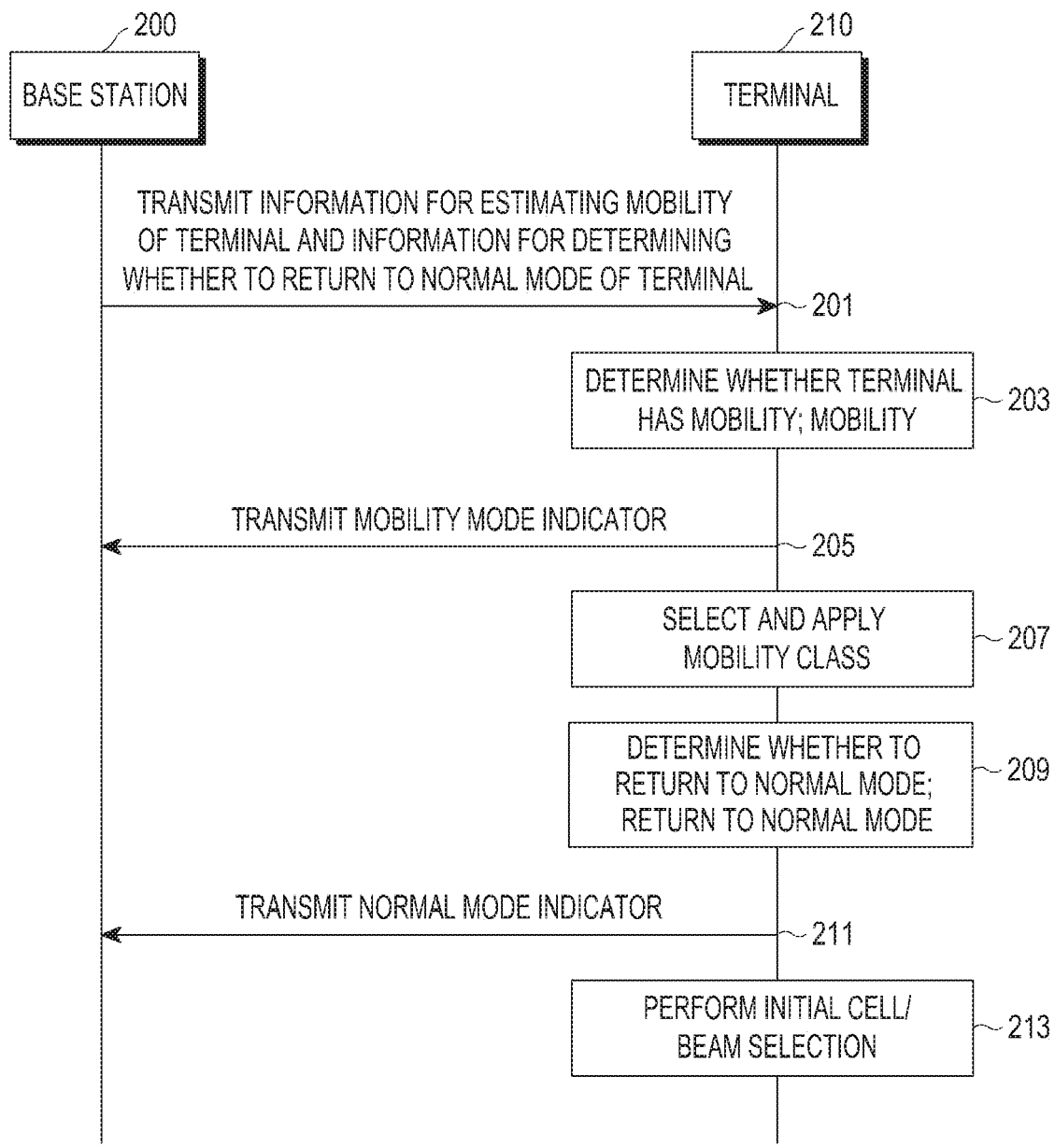
FIG. 2 is a diagram illustrating a process of applying a mobility mode to a connected-state terminal in a communication system according to an embodiment of the present disclosure.

FIG. 2 is a diagram illustrating a process of applying a mobility mode to a connected-state terminal in a communication system according to an embodiment of the present disclosure.

Referring to FIG. 2, the illustrated communication system includes a base station 200 and a terminal 210.

The base station 200 transmits, to the terminal 210, information for estimating the mobility of a terminal, for example, criteria for determining whether a terminal has mobility and threshold values to be respectively compared with the criteria; and information for determining whether a terminal needs to return to a normal mode, for example, criteria for determining whether a terminal needs to return to a normal mode and threshold values to be respectively compared with the criteria in operation 201. In this instance, the information for estimating the mobility of the terminal and the information for determining whether the terminal needs to return to a normal mode are transmitted by being included in one of a broadcasting channel signal, a dedicated channel signal, a PBSCH signal, an EPBCH signal, and a PDSCH signal.

In operation 203, the terminal 210 determines whether the terminal has mobility according to at least one of the above-described mobility determination options 1 to 6, based on the information for estimating the mobility of the terminal received in operation 201. The mobility determination options 1 to 6 have already been described, and thus, detailed descriptions thereof will be omitted.

Also, when it is determined that the terminal 210 has mobility, the terminal 210 enters a mobility mode, and transmits, to the base station 200, a mobility mode indicator indicating that the terminal 210 has entered the mobility mode in operation 205. It is assumed that the mobility mode indicator is a 1-bit indicator, and the mobility mode indicator transmitted in operation 205 is set to a value indicating that the terminal 210 enders the mobility mode. Also, the mobility mode indicator is transmitted by being included in one of a physical uplink shared channel (PUSCH) signal and a random access channel (RACH) signal.

The terminal 210, having entered the mobility mode, selects a mobility class of the terminal based on one of the above-described select options 1 to 4, and changes an existing coverage class to the mobility class in order to apply the mobility class in operation 207. The select options 1 to 4 have already been described, and thus, detailed descriptions thereof will be omitted.

In operation 209, the terminal 210 which has entered the mobility mode determines whether to return to a normal mode according to at least one of the above-described return condition options 1 to 6, based on the information for determining whether a terminal needs to return to a normal mode, received in operation 201. In this instance, the terminal 210 returns to the normal mode when at least one of the return condition options 1 to 6 is satisfied. The terminal 210 which has returned to the normal mode transmits, to the base station 200, a normal mode indicator indicating that the terminal has returned to the normal mode in operation 211. It is assumed that the normal mode indicator is a 1-bit indicator, and that the normal mode indicator transmitted in operation 211 is set to a value indicating that the terminal 210 returns from a mobility mode, in which a mobility class is applied, to a normal mode, in which an existing coverage class is applied. Also, the mobility mode indicator is transmitted by being included in one of a PUSCH signal and an RACH signal. The return condition options 1 to 6 have already been described, and thus, detailed descriptions thereof will be omitted.

Subsequently, the terminal 210 performs an initial cell and beam selection process in operation 213.

Subsequently, a coverage class management method in consideration of the mobility of an idle-state terminal will be described.

The idle-state terminal determines whether the terminal has mobility based on the above-described mobility determination options 1 to 6. The mobility determination options 1 to 6 have already been described, and thus, detailed descriptions thereof will be omitted.

Mobility determination options 1 to 4 among the mobility determination options determine whether a terminal has mobility during a predetermined period of time, and the information indicating the predetermined period of time may be shared with the terminal through a broadcasting channel signal, for example, system information, transmitted in advance from a base station, or may be transferred to the terminal through a dedicated channel signal transmitted from the base station. The dedicated channel signal may include, for example, an RRC connection release message, an RRC connection reconfiguration message, an RRC connection establishment setup message, an RRC connection reestablishment setup message, an RRC connection resume setup message, and the like.

Also, when it is determined that the idle-state terminal has mobility, the idle-state terminal enters a mobility mode, and reports the same to a base station. The base station transmits, to the idle-state terminal, a paging message based on a mobility class to which switching is performed and which is applied as the idle-state terminal enters the mobility mode. Here, the changed and applied mobility class may be selected based on one of the above-described select options 1 to 4. The select options 1 to 4 have been described above, and thus, a detailed description thereof will be omitted.

In this instance, as a mobility class is selected, paging resource allocation information related to the mobility class may be changed at the same time. Here, the paging resource allocation information may include, for example, a transmission modulation and coding scheme (MCS) index, a channel index, the number of repetitive transmissions, a transmission power value, and other related resource allocation information.

Also, when many antennas and beams are used, radio resources may be configured so that a related terminal and base station use a predetermined beam pair, a predetermined Tx beam, a predetermined Rx beam, predetermined frequency/time resources, one of a predetermined logical channel, a transmission channel, and a physical channel, and at least one of predetermined resource configuration classifications classified in advance.

Also, the mobility mode of a terminal may be determined based on information received through information block 1 of a PBSCH or information blocks 2, 3, and 4 of an EPBCH, or information received through the DCI of a PDSCH when 3GPP GERAN CIoT NB-M2M is applied. Also, the mobility mode of a terminal may be determined based on information shared with the terminal through a broadcasting channel signal, for example, system information, transmitted in advance from the base station, or information transferred to the terminal through an RRC connection release message, an RRC connection reconfiguration message, an RRC connection establishment setup message, an RRC connection reestablishment setup message, an RRC connection resume setup message, and the like when 3GPP RAN is applied.

A terminal that receives a paging message transmitted from a base station may transmit a paging response message to the base station in response to the paging message. However, when the terminal that performs discontinuous reception (DRX) does not receive a paging message during a DRX-on-duration, and does not transmit a paging response message to the base station, the base station that does not receive the paging response message may retransmit a paging message according to the following method.

That is, the base station that does not receive the paging response message sets a coverage class value to the maximum value when a previous coverage class value is not the maximum value among defined coverage class values, and retransmits a paging message. However, when the base station does not receive a paging response message even after setting the coverage class value to the maximum value and retransmitting a paging message, the base station sets coverage class values of neighboring cells within a predetermined distance from a previous cell to the maximum value and retransmits a paging message.

In this instance, the terminal may prolong the corresponding DRX-on-duration until a paging response message is received, in order for the reception of a paging response message. When a paging response message is not received during the DRX-on-duration, a paging message may be retransmitted in a subsequent DRX-on-duration.

However, when a paging response message is not received even after a coverage class value is set to the maximum value of defined coverage class values, a paging message is retransmitted, and the paging message is retransmitted to neighboring cells, a paging message may be retransmitted by setting coverage class values of base stations existing in the whole tracking area to the maximum value.

Also, when GERAN CIoT terminals perform an automatic request for repetition (ARQ) operation, a state variable indicates a current transmission and reception state, thereby acting as an acknowledgement (ACK) message. For example, when a transmission end transmits a packet in which the state variable is set to 1, a reception end transmits a state variable of 1 in order to acknowledge that the reception end receives the packet in which the transmission end state is set to 1. However, the process of setting an initial state variable may be different for a downlink and an uplink.

In the case of downlink, a base station at a transmission end needs to set the state variables of the transmission end and a reception end. Therefore, before an ARQ operation starts, the base station needs to set a terminal state variable to be the same as a base station state variable, and transmits the same to the terminal at the reception end.

In the case of uplink, a base station at a reception end needs to set the state variables of a transmission end and the reception end. Therefore, before an ARQ operation starts, the base station needs to set a terminal state variable to be the same as a base station state variable, and transmits the same to the terminal at the transmission end.

Figure 3:
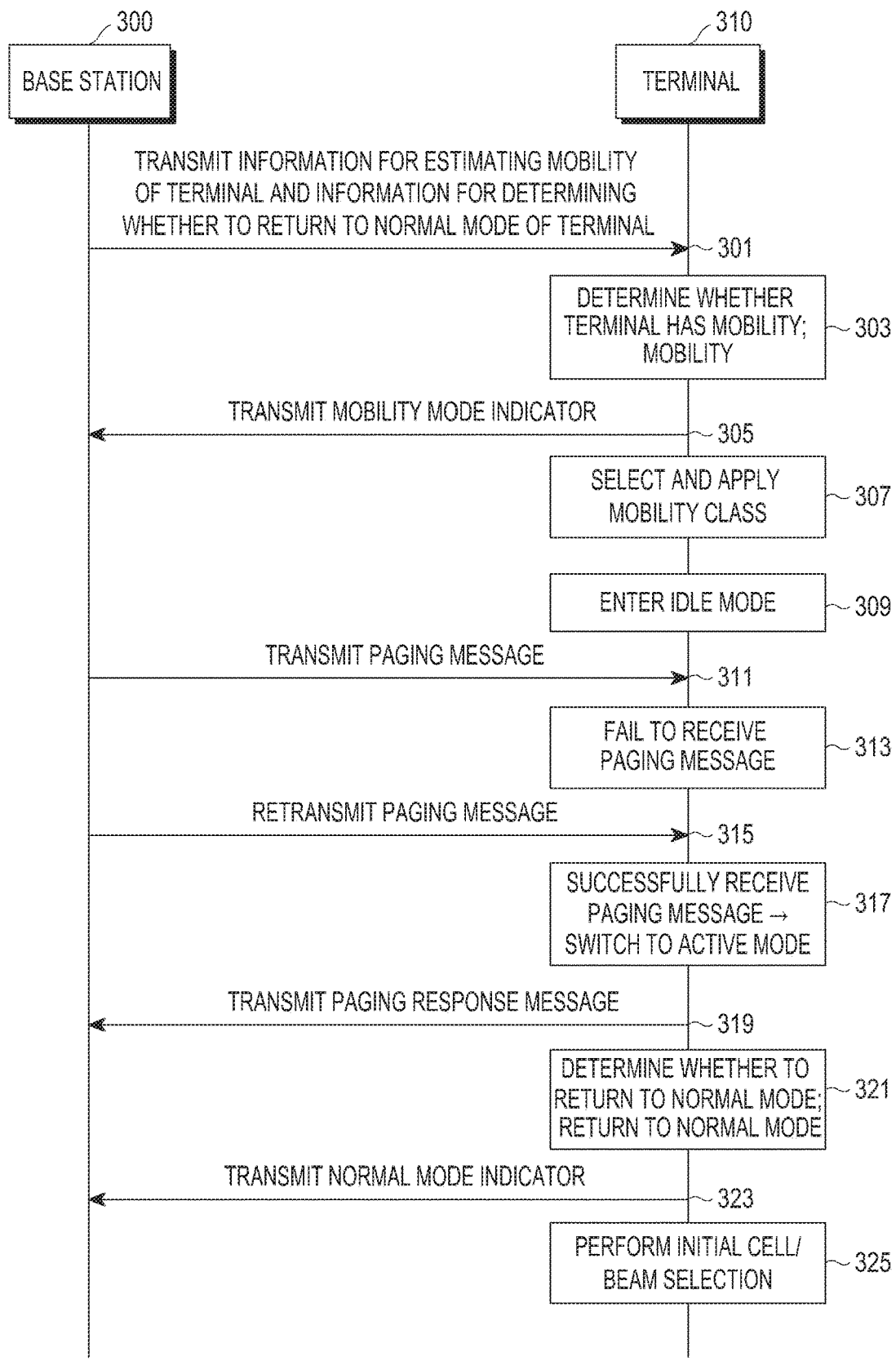
FIG. 3 is a diagram illustrating a process of applying a mobility mode to an idle-state terminal in a communication system according to an embodiment of the present disclosure.

FIG. 3 is a diagram illustrating a process of applying a mobility mode to an idle-state terminal in a communication system according to an embodiment of the present disclosure.

Referring to FIG. 3, the illustrated communication system includes a base station 300 and a terminal 310.

The base station 300 transmits, to the terminal 310, information for estimating the mobility of a terminal and information for determining whether to return to a normal mode in operation 301. The terminal 310 determines whether the terminal has mobility based on the information received in operation 301, in operation 303, and enters a mobility mode when it is determined that the terminal 310 has mobility and transmits a mobility mode indicator to the base station 300 in operation 305.

The terminal 310 that enters the mobility mode selects the mobility class of the terminal, changes an existing coverage class to the mobility class, and applies the mobility class in operation 307. Operations 301 to 307 are the same as operations 201 to 207 of FIG. 2, and thus, detailed descriptions thereof will be omitted.

The terminal 310 to which the mobility class is applied enters an idle mode in operation 309, and subsequently, the base station 300 transmits a paging message to the terminal 310 in operation 311. The terminal 310 that enters the idle mode may receive the paging message in a DRX-on-duration, and the terminal that receives the paging message transmits a paging response message to the base station 300. However, when the terminal 310 fails to receive the paging message in operation 313, the terminal does not transmit a paging response message, and the base station that does not receive the paging response message retransmits a paging message in operation 315. Here, the case in which the reception of a paging message fails may include, for example, the case in which a terminal does not receive a paging message, or the case in which a paging message is not decodable, even though a terminal receives a paging message. The paging message transmitted in operations 311 and 315 may be transmitted by being included in a PUSCH signal.

The CIoT terminal 310 that successfully receives a retransmitted paging message switches an idle mode to an active mode in operation 317, and transmits a paging response message to the base station 300 in response to the retransmitted paging message in operation 319. The paging response message is transmitted by being included in a PUSCH signal or an RACH.

Also, in operation 321, the terminal 310 which has transmitted the paging response message determines whether to return to a normal mode according to at least one of the above-described return condition options 1 to 6, based on the information for determining whether a terminal needs to return to a normal mode, which is received in operation 301. In this instance, the terminal 310 returns to the normal mode when at least one of the return condition options 1 to 6 is satisfied. The terminal 310 which has returned to the normal mode transmits, to the base station 300, a normal mode indicator indicating that the terminal has returned to the normal mode in operation 323. It is assumed that the normal mode indicator is a 1-bit indicator, and that the normal mode indicator transmitted in operation 323 is set to a value indicating that the terminal 310 has returned from the mobility mode, in which a mobility class is applied, to the normal mode, in which an existing coverage class is applied. Also, the mobility mode indicator is transmitted by being included in a PUSCH signal and an RACH signal. The return condition options 1 to 6 have already been described, and thus, detailed descriptions thereof will be omitted.

Subsequently, the terminal 310 performs an initial cell and beam selection process in operation 325.

When a terminal is moving or a channel has a frequently varying channel gain, a coverage class may be frequently changed. Therefore, the amount of uplink feedback for reporting the change of a coverage class to a base station may increase, and thus, the amount of power consumed by the terminal may also increase. Hereinafter, a method of efficiently updating a coverage class in order to overcome the above-described drawbacks will be described. Also, a method of updating a coverage class based on hysteresis and a method of updating a coverage class based on the purpose and circumstances of a system will be separately described as solutions for the drawbacks.

1) the method of updating a coverage class based on hysteresis

Hysteresis indicates a method of giving a margin for updating a coverage class so that a coverage class before update remains longer than normal coverage update. Here, normal coverage update indicates that a terminal updates a coverage class every time a coverage class is changed based on the measurement of a synchronization channel and other channels.

Base station coverage is classified into N coverage classes, as described in FIG. 1. When coverage classes remaining after excluding coverage class 1 and coverage class N are referred to as intermediate coverage classes, the intermediate coverage classes may be updated to higher coverage classes or lower coverage classes according to the following conditions.

1-1) update of intermediate coverage classes

A terminal receives a reference signal and/or synchronization signal transmitted from a base station to measure a pathloss, and checks a condition for updating an intermediate coverage class to a higher coverage class, that is, whether a measured pathloss value is greater than or equal to a value obtained by adding a margin value to a threshold value. When the measured pathloss value is greater than or equal to a value (a threshold value+a margin value), the terminal updates the current coverage class to a higher coverage class. Here, the threshold value is a boundary value that distinguishes the current coverage class and a higher coverage class, and the margin value indicates a margin that is set differently based on the purpose and circumstances of a system.

Also, the terminal may check a condition for updating an intermediate coverage class to a lower coverage class, that is, whether the measured pathloss value is less than or equal to a value obtained by subtracting a margin value from a threshold value. When the measured pathloss value is less than or equal to a value (a threshold value−a margin value), the terminal updates the current coverage class to a lower coverage class. Here, the threshold value is a boundary value that distinguishes the current coverage class from a lower coverage class, and the margin value indicates a margin that is set differently based on the purpose and circumstances of a system.

1-2) update of a first coverage class

Coverage class 1, which is a first coverage class, is updated to a lower coverage class according to the following conditions. The first coverage class is only updated to a lower coverage class, unlike an intermediate coverage class, which is updated to a higher coverage class or a lower coverage class.

A terminal may check a condition for updating the first coverage class to a lower coverage class, that is, whether a measured pathloss value is less than or equal to a value obtained by subtracting a margin value from a threshold value. When the measured pathloss value is less than or equal to a value obtained through the calculation (threshold value−margin value), the terminal updates the current coverage class to a lower coverage class. Here, the threshold value is a boundary value that distinguishes the current coverage class from a lower coverage class, and the margin value indicates a margin that is set differently based on the purpose and circumstances of a system.

1-3) update of a last coverage class

Coverage class N, which is the last coverage class, is updated to a higher coverage class according to the following conditions. The last coverage class is only updated to a higher coverage class, unlike an intermediate coverage class which is updated to a higher coverage class or a lower coverage class, and triggers a cell reselection operation by checking a cell reselection condition.

A terminal may check a condition for updating the last coverage class to a higher coverage class, that is, whether a measured pathloss value is greater than or equal to a value obtained by adding a margin value to a threshold value. When the measured pathloss value is greater than or equal to a value (a threshold value+a margin value), the terminal updates the current coverage class to a higher coverage class. Here, the threshold value is a boundary value that distinguishes the current coverage class and a higher coverage class, and the margin value indicates a margin that is set differently based on the purpose and circumstances of a system.

Also, the terminal may check a cell reselection condition, that is, whether a pathloss value measured based on a reference signal and/or synchronization signal transmitted from a serving base station is greater than or equal to a value obtained by adding a margin value to a pathloss value measured based on a reference signal and/or synchronization signal transmitted from a neighboring base station. When the pathloss value associated with the serving base station is greater than or equal to (the pathloss value associated with the neighboring base station+margin value), the terminal performs a cell reselection operation. Here, the margin value indicates a margin that may be set differently based on the purpose and circumstances of a system.

2) the method of updating a coverage class based on the purpose and situation of a system, or the like 2-1) update a coverage class for energy conservation Quick updating to a higher coverage class and late updating to a lower coverage class may be preferable from the aspect of conservation of terminal energy. Therefore, when the purpose of a system is set to terminal energy conservation, at least one of the number of times that a coverage class update condition is satisfied and a satisfied time duration value is controlled based on the corresponding condition. That is, the number of times that an update condition is satisfied and a satisfied time duration value, which are taken into consideration by conditions for updating a coverage class to a higher coverage class, may be controlled to lower values than the current values. The number of times that an update condition is satisfied and the satisfied time duration value, which are taken into consideration by conditions for updating a coverage class to a lower coverage class, may be controlled to higher values than the current values.

Also, in the method of updating a coverage class based on hysteresis, a threshold value and a margin value, taken into consideration by conditions for updating a coverage class to a higher coverage class, are controlled to lower values than the current values, and a threshold value and a margin value, taken into consideration by conditions for updating a coverage class to a lower coverage class, are controlled to higher values than the current values. In this instance, controlling the number of times that an update condition is satisfied and a satisfied time duration value and controlling the threshold value and the margin value, taken into consideration by the update condition, may be applied separately or simultaneously.

2-2) update of a coverage class for improving reliability

Late updating to a higher coverage class and quick updating to a lower coverage class may be advantageous in improving the reliability of a terminal. Therefore, when the purpose of a system is set in order to the improvement of reliability of a terminal, at least one of the number of times that a coverage class update condition is satisfied and a satisfied time duration value is controlled based on the corresponding condition. That is, the number of times that an update condition is satisfied and a satisfied time duration value which are taken into consideration by conditions for updating a coverage class to a higher coverage class, may be controlled to higher values than the current values. The number of times that an update condition is satisfied and a satisfied time duration value, which are taken into consideration by conditions for updating a coverage class to a lower coverage class, may be controlled to lower values than the current values.

Also, in the method of updating a coverage class based on hysteresis, a threshold value and a margin value, taken into consideration by conditions for updating a coverage class to a higher coverage class, are controlled to higher values than the current values, and a threshold value and a margin value, taken into consideration by conditions for updating a coverage class to a lower coverage class, are controlled to lower values than the current values. In this instance, controlling the number of times that an update condition is satisfied and a satisfied time duration value and controlling the threshold value and the margin value, taken into consideration by update conditions, may be applied separately or simultaneously.

2-3) update of a coverage class when a terminal is moving

The mobility of a terminal may affect the speed at which a coverage class is updated. For example, when the terminal is moving at high speed, the update speed of a coverage class also increases. Therefore, when the situation of a system is set to a situation in which a terminal is moving, at least one of the number of times that a coverage class update condition is satisfied and a satisfied time duration value is controlled based on the corresponding condition. That is, the number of times that an update condition is satisfied and a satisfied time duration value, which are taken into consideration by conditions for updating a coverage class to a higher/lower coverage class, are controlled to higher values or lower values than the current values.

Also, in the above-described method of updating a coverage class based on hysteresis, a threshold value and a margin value, taken into consideration by conditions for updating a coverage class to a higher/lower coverage class, may be controlled to higher values or lower values than the current values. In this instance, controlling the number of times that an update condition is satisfied and a satisfied time duration value and controlling the threshold value and the margin value, taken into consideration by update conditions, may be applied separately or simultaneously.

2-4) update of a coverage class based on the coverage class to which a terminal belongs The coverage class to which a terminal currently belongs may affect update of a coverage class. Therefore, the number of times that an update condition is satisfied and a satisfied time duration value, which are taken into consideration by conditions for updating a coverage class to a higher/lower coverage class, are controlled to higher values or lower values than the current values for each coverage class.

Also, in the above-described method of updating a coverage class based on hysteresis, a threshold value and a margin value, taken into consideration by conditions for updating a coverage class to a higher/lower coverage class, may be controlled to higher values or lower values than the current values for each coverage class. In this instance, controlling the number of times that an update condition is satisfied and a satisfied time duration value and controlling the threshold value and the margin value, taken into consideration by update conditions, may be applied separately or simultaneously.

2-5) update of a coverage class based on the device type of a terminal

The device type of a terminal may affect the update of a coverage class. Here, the device type indicates the type of sensor, the type of product, or the like. The type of sensor may include, for example, a global positioning system (GPS) sensor, an acceleration sensor, a temperature sensor, a power sensor, a gas sensor, and the like. The type of product may include, for example, a wearable device, a smart meter, a device for tracking freight transportation, or the like.

That is, the number of times that an update condition is satisfied and a satisfied time duration value, which are taken into consideration by conditions for updating a coverage class to a higher/lower coverage class, are controlled to higher values or lower values than the current values for each device type. Also, in the above-described method of updating a coverage class based on hysteresis, a threshold value and a margin value, taken into consideration by conditions for updating a coverage class to a higher/lower coverage class, may be controlled to higher values or lower values than the current values for each coverage class. In this instance, controlling the number of times that an update condition is satisfied and a satisfied time duration value and controlling the threshold value and the margin value, taken into consideration by update conditions, may be applied separately or simultaneously.

2-6) update of a coverage class based on the service type of a terminal

The service type of a terminal may affect the update of a coverage class. Here, the service type may be the type of traffic (e.g., a mobile autonomous report, a network triggered report, software update, an exceptional report, a periodic report, or the like), a subscribed rate system, an application, and the like.

That is, the number of times that an update condition is satisfied and a satisfied time duration value, which are taken into consideration by conditions for updating a coverage class to a higher/lower coverage class, are controlled to higher values or lower values than the current values for each service type. Also, in the above-described method of updating a coverage class based on hysteresis, a threshold value and a margin value, taken into consideration by conditions for updating a coverage class to a higher/lower coverage class, may be controlled to higher values or lower values than the current values for each service type. In this instance, controlling the number of times that an update condition is satisfied and a satisfied time duration value and controlling the threshold value and the margin value, taken into consideration by update conditions, may be applied separately or simultaneously.

2-7) update of a coverage class based on a system set value

A system set value may affect the update of a coverage class. Here, the system set value may be a paging cycle length, resource configuration information (e.g. an MCS index, the number of repetitive transmissions, a pathloss value, a coverage class value, and the like), a power saving mode (PSM) set value, and the like.

That is, the number of times that an update condition is satisfied and a satisfied time duration value, which are taken into consideration by conditions for updating a coverage class to a higher/lower coverage class, are controlled to higher values or lower values than the current values for each system set value. Also, in the above-described method of updating a coverage class based on hysteresis, a threshold value and a margin value, taken into consideration by conditions for updating a coverage class to a higher/lower coverage class, may be controlled to higher values or lower values than the current values for each system set value. In this instance, controlling the number of times that an update condition is satisfied and a satisfied time duration value and controlling the threshold value and the margin value, taken into consideration by update conditions, may be applied separately or simultaneously.

2-8) update of a coverage class based on other user-set values

Other user-set values may affect the update of a coverage class. Here, a user-set value may be a value selected by a user or a value set through software/hardware.

That is, the number of times that an update condition is satisfied and a satisfied time duration value, which are taken into consideration by conditions for updating a coverage class to a higher/lower coverage class, are controlled to higher values or lower values than the current values for each user-set value. Also, in the above-described method of updating a coverage class based on hysteresis, a threshold value and a margin value, taken into consideration by conditions for updating a coverage class to a higher/lower coverage class, may be controlled to higher values or lower values than the current values for each user-set value. In this instance, controlling the number of times that an update condition is satisfied and a satisfied time duration value and controlling the threshold value and the margin value, taken into consideration by update conditions, may be applied separately or simultaneously.

A value indicating the purpose of a system, a value indicating the situation of a system, and other configuration information, which are taken into consideration when updating a coverage class in 2-1) to 2-8), may be shared in advance through at least one of system information 1, 2, 3, and 4 or received through a downlink control channel signal, or may be embedded in a terminal itself.

Base station coverage may be classified into a plurality of coverage classes, and the plurality of coverage classes may consume different amounts of resources. Particularly, terminals located in a boundary area in coverage class areas unnecessarily consume a larger amount of resources, which affect the terminal's lifetime. Therefore, in order to overcome the above-described drawbacks, a method of reconfiguring resources that have been configured for the transmission and reception between a terminal and a base station by taking into consideration a coverage class will be described. Also, a method of interrupting excessive resource consumption by a terminal or a base station and a method of managing resources by classifying a coverage class into a greater number of subdivided coverage classes will be separately described as solutions to overcome this drawback.

1) method of interrupting excessive resource consumption by a terminal or a base station Excessive resource consumption is attributable to various transmission operations that use unnecessarily excessive amounts of resources. Operations that perform transmission using unnecessarily excessive amounts of resources may include, for example, an operation of repeatedly transmitting the same signal, an operation of performing transmission by setting an MCS level to be higher than a level required by the current channel condition, an operation of performing transmission by setting transmission power to be higher than a level required by the current channel condition, an operation of performing transmission for a longer period of time than the period of time required in the time domain, an operation of performing transmission in a wider frequency band than the frequency band required in the frequency domain, and the like.

Figure 4:
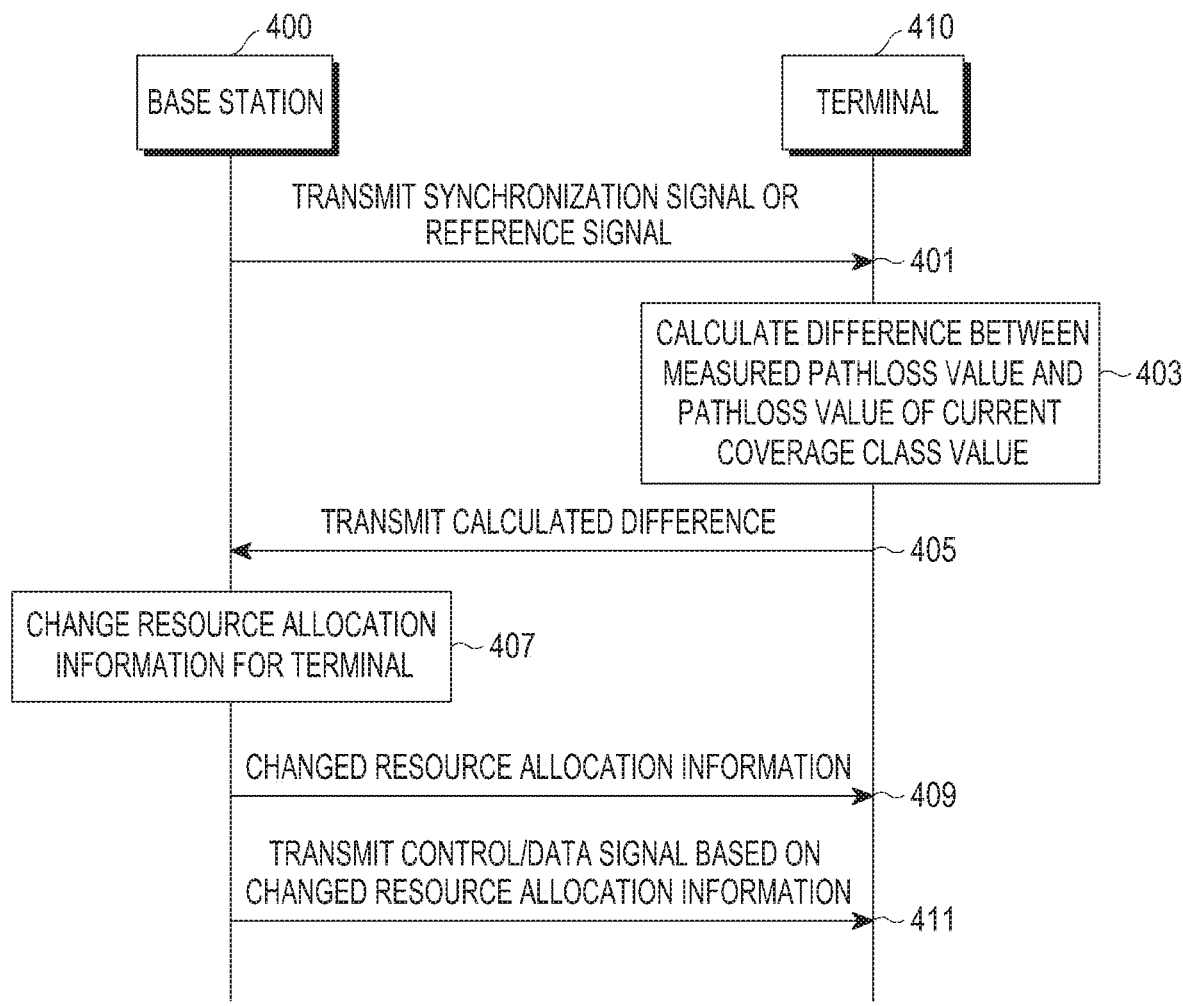
FIG. 4 is a diagram illustrating a process of interrupting excessive resource consumption by a base station in a communication system according to an embodiment of the present disclosure.

FIG. 4 is a diagram illustrating a process of interrupting excessive resource consumption by a base station in a communication system according to an embodiment of the present disclosure.

Referring to FIG. 4, the illustrated communication system includes a base station 400 and a terminal 410.

The base station 400 transmits a synchronization signal or a reference signal to the terminal 410 in operation 401. The terminal 410 measures a pathloss of the synchronization signal or reference signal received from the base station 400, and calculates a difference between the measured pathloss value and the coverage class value of the coverage class to which the terminal 410 currently belongs in operation 403. Here, the difference may be an index value mapped to a table shared in advance, or a simplified value which is derived from an actual analog value. Subsequently, the terminal 400 transmits the difference calculated in operation 403 to the base station 400 in operation 405.

The base station 400 changes resource allocation information to a smaller amount of resources than the amount of resources set for the current coverage class by reflecting the difference between the measured pathloss value and the current coverage class value received from the terminal 410, in operation 407. Subsequently, the base station 400 transmits the changed resource allocation information to the terminal 410 in operation 409. In this instance, the changed resource allocation information may be transmitted in the form of system information or in the form of downlink control information. The terminal 410 that receives the changed resource allocation information may itself determine the resources allocated to the terminal 410.

Subsequently, when a downlink control signal and/or data signal is generated, the base station 400 transmits the control signal and/or data signal to the terminal 410 based on the changed resource allocation information in operation 411.

Figure 5:
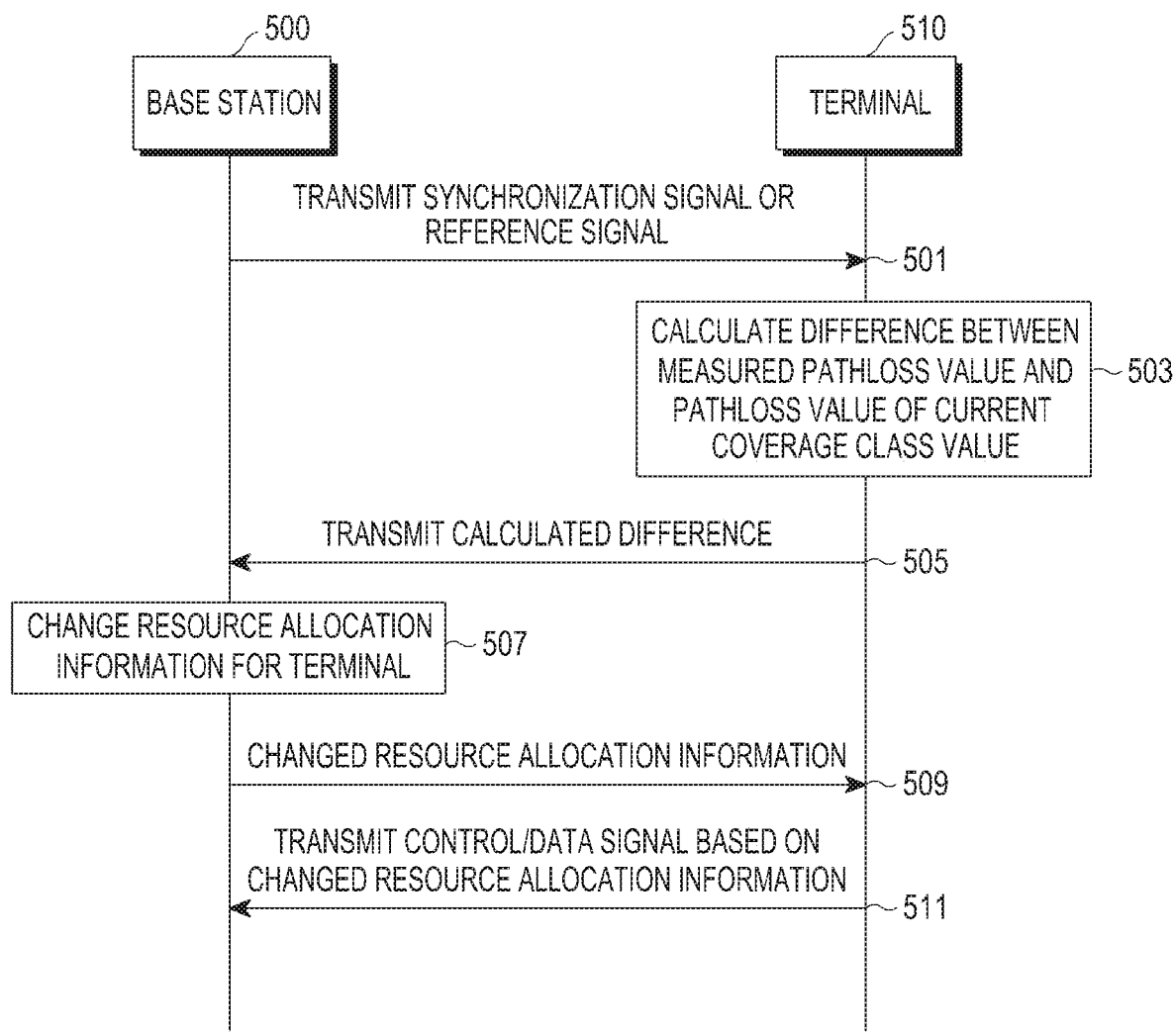
FIG. 5 is a diagram illustrating a process of interrupting excessive resource consumption by a mobile station in a communication system according to an embodiment of the present disclosure.

FIG. 5 is a diagram illustrating a process of interrupting excessive resource consumption by a base station in a communication system according to an embodiment of the present disclosure.

Referring to FIG. 5, the illustrated communication system includes a base station 500 and a terminal 510.

The base station 500 transmits a synchronization signal or a reference signal to the terminal 510 in operation 501. The terminal 510 measures pathloss of the synchronization signal or reference signal received from the base station 500 and calculates a difference between the measured pathloss value and the coverage class value of a coverage class to which the terminal 510 currently belongs in operation 503. Here, the difference may be an index value mapped to a table shared in advance, or a simplified value which is derived from an actual analog value. Subsequently, the terminal 500 transmits the difference, calculated in operation 503, to the base station 500 in operation 505.

The base station 500 changes resource allocation information to a smaller amount of resources than the amount of resources set for the current coverage class by reflecting the received difference between the measured pathloss value and the current coverage class value, in operation 507. Subsequently, the base station 500 transmits the changed resource allocation information to the terminal 510 in operation 509. In this instance, the changed resource allocation information may be transmitted in the form of system information or in the form of downlink control information. The terminal 510 that receives the changed resource allocation information may determine the resource allocated to the terminal 510 itself.

Subsequently, when an uplink control signal and/or data signal is generated, the terminal 510 transmits the control signal and/or data signal to the base station 500 based on the changed resource allocation information in operation 511.

2) the method of managing resources by classifying coverage classes into a greater number of subdivided coverage classes When resource allocation is performed by classifying a coverage class into a greater number of subdivided coverage classes, each terminal may perform optimal resource allocation, and thus both a base station and the terminal can conserve resources. However, when an excessively large number of classified coverage classes exists, coverage class update may be frequently performed, whereby a terminal that is moving may consume an excessively large amount of energy. Therefore, the method of allocating resources by classifying coverage classes into a greater number of subdivided coverage classes is effective for a static terminal or a terminal for which coverage class update is not frequently performed.

Whether a terminal is static is determined based on static terminal determination options described as follows. When at least one of the static terminal determination options is satisfied, the terminal is determined to be a static terminal.

static terminal determination option 1: When the number of times that the coverage class of a related terminal is updated during a predetermined period of time is less than or equal to a predetermined threshold value, it is determined that the related terminal is a static terminal.

static terminal determination option 2: When variation in the coverage class of a related terminal or variation in a measured signal quality during a predetermined period of time is less than or equal to a predetermined threshold value, it is determined that the related terminal is a static terminal.

static terminal determination option 3: When the number of times that a related terminal reselects a cell during a predetermined period of time is less than or equal to a predetermined threshold value, it is determined that the related terminal is a static terminal.

static terminal determination option 4: Whether a related terminal is a static terminal is determined based on an application, a sensor type, or the like used by the related terminal. For example, when the application being used is a power meter application or a fire alarm application, the related terminal is determined to be a static terminal.

static terminal determination option 5: Whether a related terminal is a static terminal is determined based on a combination of static terminal determination options 1 to 4.

Also, when the number of classified coverage classes increases, downlink control channel signals configured for each of the increased number of coverage classes need to be transmitted on downlink control channels which have been configured for each of previous coverage classes. Therefore, a method of sharing and using limited downlink control channels is required. That is, a base station may apply a downlink control channel interval to each coverage class differently by taking into consideration the circumstances of each coverage class. In this instance, the circumstances of each coverage class are determined based on the number of terminals belonging to a corresponding coverage class, the traffic load, the number of repetitive transmissions required for successful data transmission and reception, a time duration, and at least one of the above-described static terminal determine operations 1 to 4.

Also, configuration information of a downlink control channel configured for each coverage class may be transmitted in the form of system information, or may be transmitted in the form of downlink control information. Here, the configuration information of the downlink control channel may include, for example, a downlink control channel interval, the location of the start and the end of a downlink control channel, channel information, and the like.

For example, assuming that a base station coverage is classified into three coverage classes, namely coverage class 1 to coverage class 3, downlink control channel 1 operates a downlink control channel of coverage class 1, downlink control channel 2 operates a downlink control channel of coverage class 2, and downlink control channel 3 operates a downlink control channel of coverage class 3, when each coverage class is classified into two subdivided coverage classes, downlink control channel 1 to downlink control channel 3 may be operated as follows. When each coverage class is classified into two subdivided coverage classes, a total of 6 coverage classes is provided. That is, downlink control channel 1 operates downlink control channels of coverage classes 1 and 6, downlink control channel 2 operates downlink control channels of coverage classes 2 and 5, and downlink control channel 3 operates downlink control channels of coverage classes 3 and 4. Here, downlink control channels 1 to 3 operate as described above in order to evenly distribute a traffic load over coverage classes.

As another example, when coverage class update is frequently performed, downlink channels adjacent to each other may be operated. That is, downlink control channel 1 operates downlink control channels of coverage classes 1 and 2, downlink control channel 2 operates downlink control channels of coverage classes 3 and 4, and downlink control channel 3 operates downlink control channels of coverage classes 5 and 6.

Figure 6:
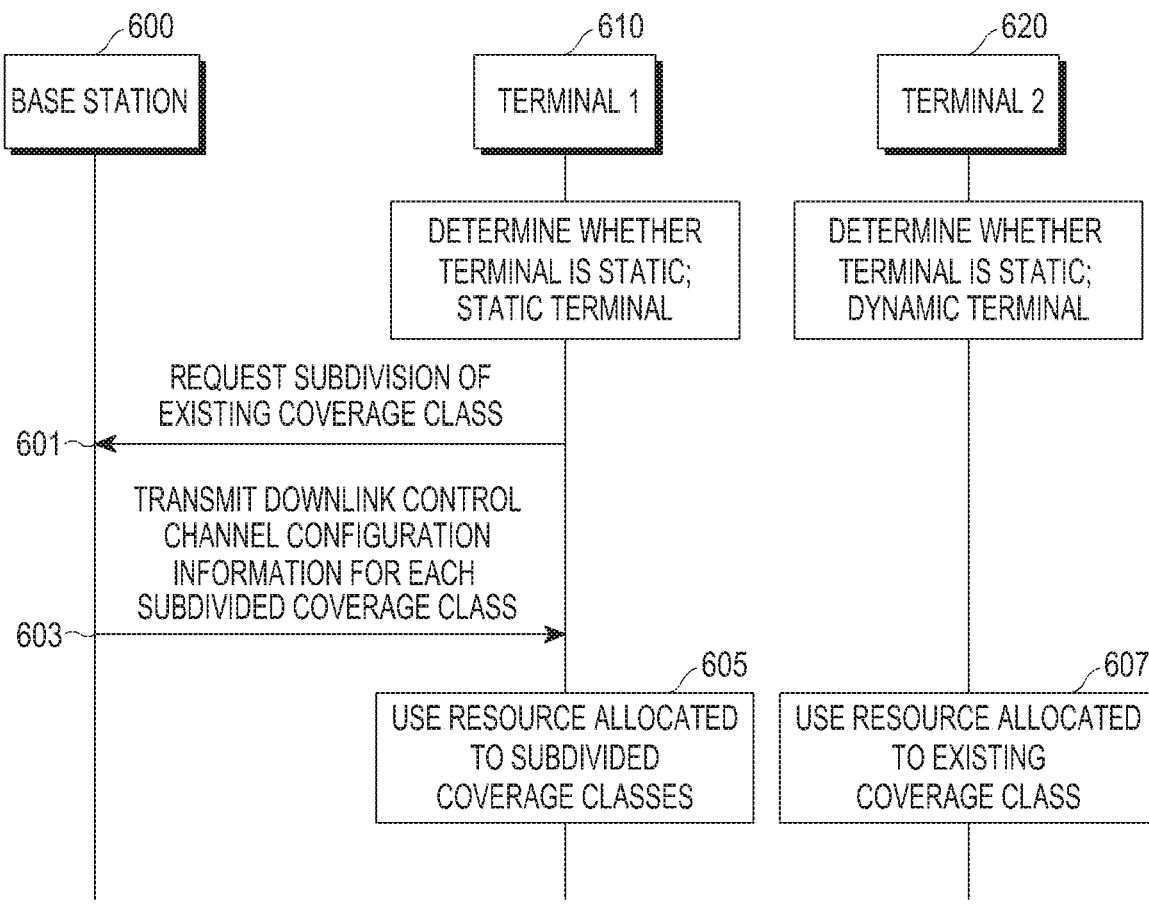
FIG. 6 is a diagram illustrating a process in which a base station classifies a coverage class into a greater number of subdivided coverage classes and manages resources in a communication system according to an embodiment of the present disclosure.

FIG. 6 is a diagram illustrating a process by which a base station classifies a coverage class into a greater number of subdivided coverage classes and manages resources in a communication system according to an embodiment of the present disclosure.

Referring to FIG. 6, the illustrated communication system includes a base station 600, terminal 1 610, and terminal 2 620.

Each of terminal 1 610 and terminal 2 620 may determine whether terminal itself is a static terminal according to at least one of static terminal determination options 1 to 5. Although not illustrated, it is assumed that information for determining a static terminal is received in advance from the base station. Also, it is assumed that the determination shows that terminal 1 610 is a static terminal and that terminal 2 620 is not a static terminal.

Terminal 1 610, which is a static terminal, requests the base station 600 to subdivide an existing coverage class in operation 601. The base station transmits, to terminal 1 610, configuration information of a downlink control channel configured for each subdivided coverage class in operation 603. The configuration information of a downlink control channel may include, for example, a downlink control channel interval, the location of the start and the end of a downlink control channel, channel information, and the like.

Terminal 1 610 transmits and receives a control signal and/or data signal using a resource allocated to a subdivided coverage class based on the downlink control channel configuration information received from the base station 600 in operation 605.

Terminal 2 620, which is a dynamic terminal, transmits and receives a control signal and/or data signal using a resource allocated to an existing coverage class in operation 607.

Coverage classes may consume significantly different amounts of resource from each other, and the imbalance of traffic among the coverage classes is attributable to the difference in resource consumption. Hereinafter, accordingly, a method for mitigating the traffic imbalance among the coverage classes will be described. Also, a method of evenly distributing a load across coverage classes and a method of distributing a channel which has been allocated to an underloaded coverage class to a terminal belonging to an overloaded coverage class will be separately described as solutions to overcome the above-described drawback.

1) the method of evenly distributing a load over coverage classes

Figure 7A:
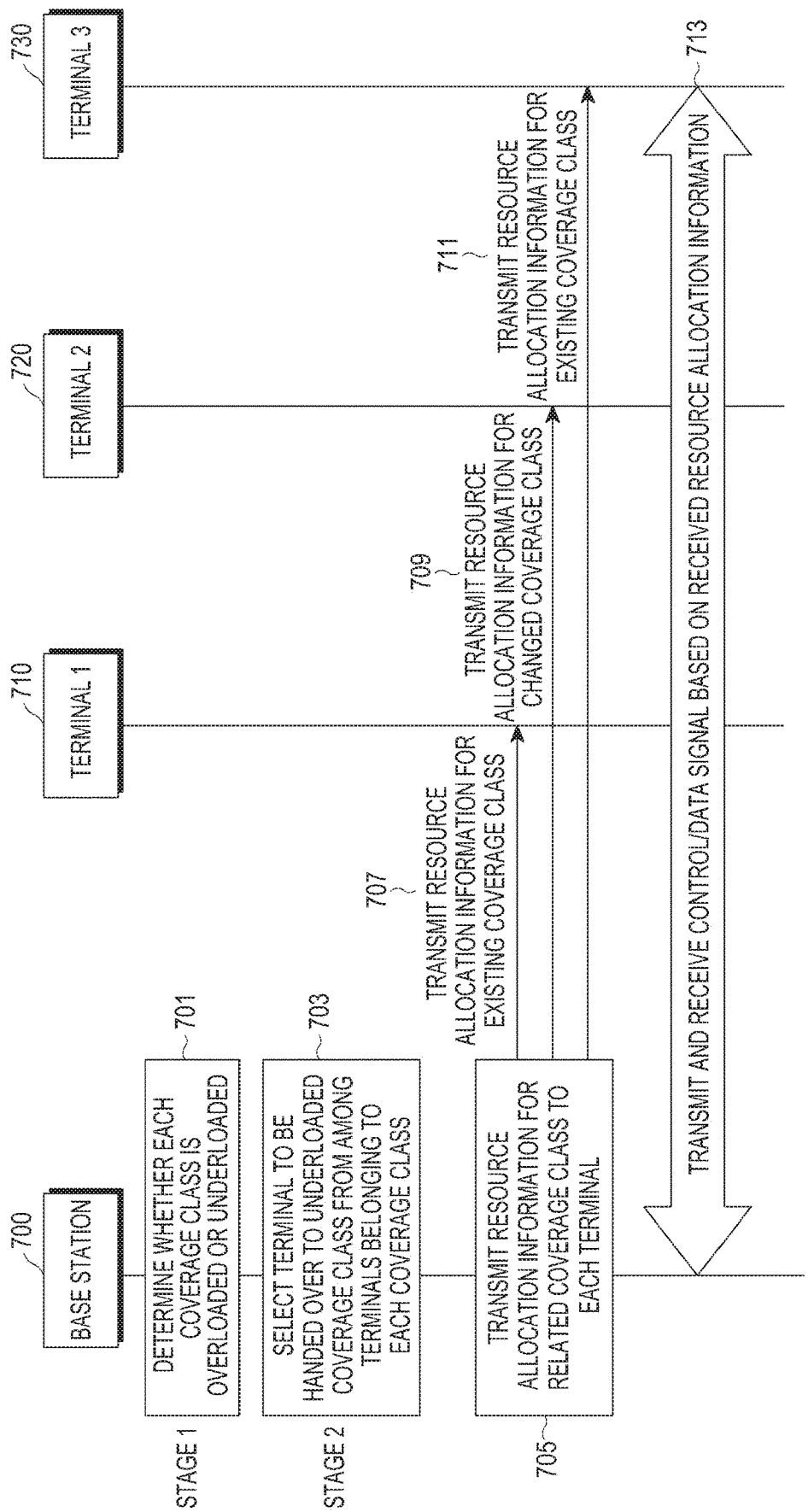
FIGS. 7A and 7B are diagrams illustrating a process in which a base station evenly distributes a load among coverage classes and manages resources in a communication system according to an embodiment of the present disclosure.
Figure 7B:
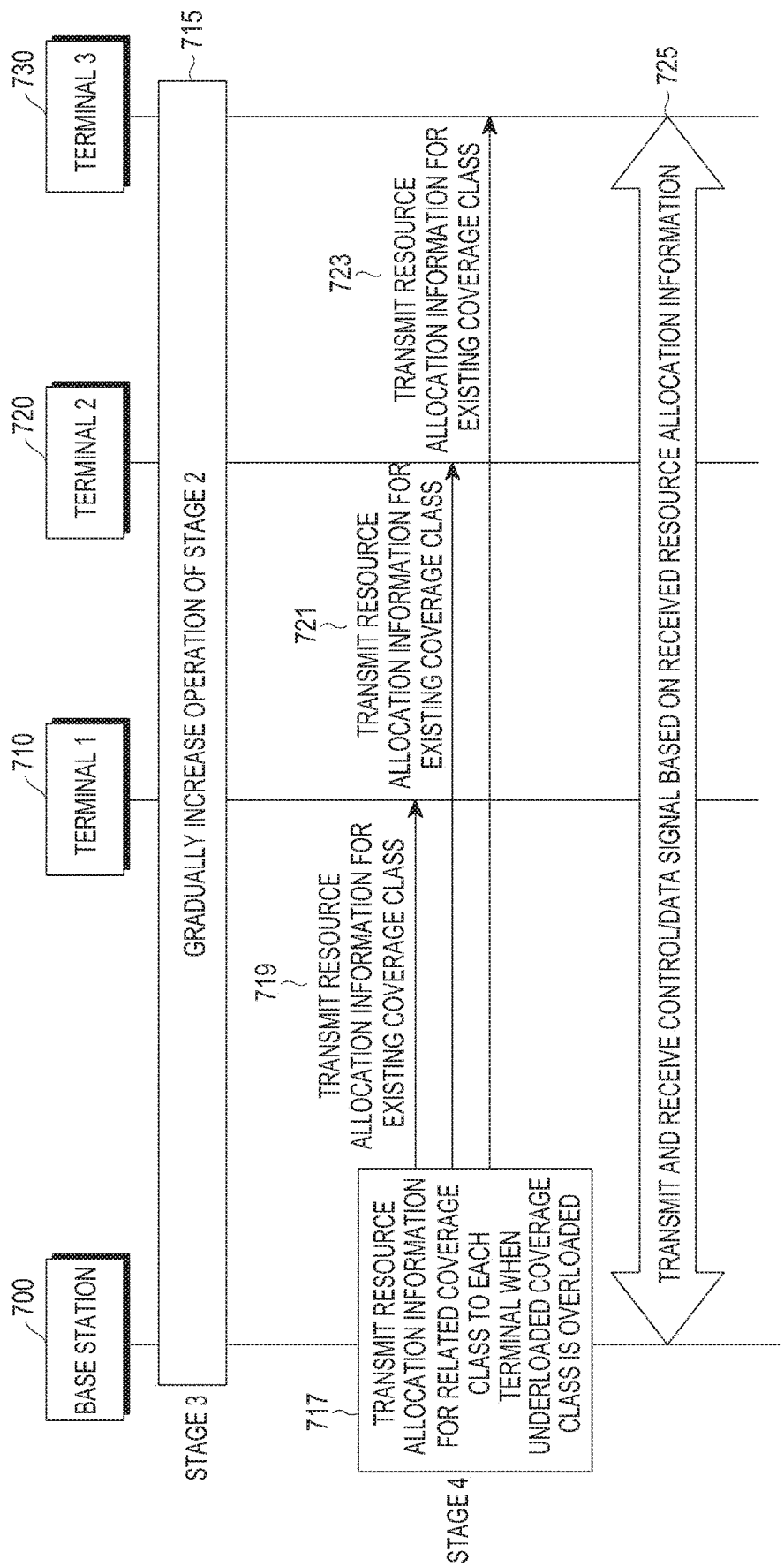

FIGS. 7A and 7B are diagrams illustrating a process in which a base station evenly distributes a load over coverage classes and manages resources in a communication system according to an embodiment of the present disclosure.

Referring to FIGS. 7A and 7B, the illustrated communication system includes a base station 700, terminal 1 710, terminal 2 720, and terminal 3 730. Here, it is assumed that terminal 1 710 and terminal 2 720 belong to an overloaded coverage class and that terminal 3 730 belongs to an underloaded coverage class.

The base station 700 determines whether each of a plurality of coverage classes is overloaded or underloaded in operation 701. That is, the base station 700 determines that a related coverage class is overloaded when the number of messages queued in a control message or data message transmission queue during a period of time predetermined for the related coverage class is greater than or equal to a predetermined threshold value. Also, the base station 700 determines that the related coverage class is underloaded when the number of terminals to be scheduled during a period of time predetermined for the related coverage class is less than or equal to a predetermined threshold value or when a control message or data message is not transmitted for a predetermined period of time.

In operation 703, the base station 700, which has determined whether each coverage class is overloaded or underloaded, selects a terminal to be handed over to an underloaded coverage class from among terminals belonging to an overloaded coverage class, that is, terminal 1 710 and terminal 2 720. In this instance, the base station 700 may hand over a part of a control message or data message of a downlink channel operated by an overloaded coverage class to a channel operated by an underloaded coverage class. Here, the terminal to be handed over to an underloaded coverage class may be selected based on at least one of a terminal identity (ID) and Quality of Service (QoS) type of each terminal, or may be randomly selected. Also, the control message or data message to be handed over to an underloaded coverage class may be selected based on at least one of the sequence number, the length, and the QoS type of each message. FIGS. 7A and 7B assume that terminal 2 720 is a terminal to be handed over to an underloaded coverage class.

The base station 700, which has selected a terminal to be handed over to an underloaded coverage class, transmits, to each terminal, resource allocation information associated with a related coverage class in the form of system information or in the form of downlink control information in operation 705. That is, the base station 700 transmits resource allocation information associated with an existing coverage class to terminal 1 710 on an existing overloaded coverage class channel in operation 707. The base station 700 transmits resource allocation information associated with a changed coverage class to terminal 2 720, which is to be handed over to an underloaded coverage class from an existing overloaded coverage class in operation 709. The base station 700 transmits resource allocation information associated with an existing coverage class to terminal 3 730 in an existing underloaded coverage class channel in operation 711. In operation 713, each terminal transmits a control signal and/or data signal based on resource allocation information received in operations 707, 709, and 711.

In this instance, the period of time in which the operation described in stage 2 of FIGS. 7A and 7B is applied and the amount of a message handed over by the operation described in stage 2 may be gradually increased in operation 715. That is, although a channel is determined to be an underloaded coverage class, the underloaded coverage class can be overloaded when all of the control messages and data messages of an overloaded coverage class channel use the underloaded coverage class channel. Therefore, a method may be applied in which the application time of the operation and the amount of a message to be handed over are set to be low at an initial stage, and in which the application time and the amount of message to be handed over are gradually increased when an underloaded coverage class remains underloaded. The application time and the amount of message to be handed over may be increased based on an exponential increment mode, a linear increment mode, an optimal increment mode, or other modes.

However, when the underloaded coverage class becomes overloaded due to the increase in the application time and the amount of a message to be handed over, the base station 700 applies a method of reducing the application time and the amount of a message to be handed over. That is, a method of returning to a value before the application time and the amount of a message to be handed over are increased, a method of reducing the same to 0, a method of reducing the same by half, and other methods may be applied.

Subsequently, the base station 700 transmits, to each terminal, resource allocation information associated with a related coverage class in the form of system information or in the form of downlink control information in operation 717. Here, it is assumed that terminal 2 720, which has been handed over to an underloaded coverage class, returns to an existing coverage class, and that the base station 700 transmits resource allocation information associated with an existing coverage class to each terminal in operations 719, 721, and 723. In operation 725, each terminal transmits and receives a control signal and/or data signal based on resource allocation information received in operations 719, 721, and 723.

2) the method of distributing a channel which has been allocated to an underloaded coverage class to a terminal belonging to an overloaded coverage class 2-1) select a channel having a high channel gain among channels for each coverage class Each terminal belonging to a coverage class selects a channel having a relatively high channel gain from among channels operated in the coverage class and receives a downlink control message and a data message. To this end, each terminal measures a signal of a related channel received from a base station, for example, a PDCCH signal, selects a channel having a relatively high channel gain as a preferred channel, and reports the same to the base station.

2-2) select a channel for each purpose from among channels for each coverage class A channel for supporting a connected state and a channel for supporting an idle state may be separately selected from among channels operated in a coverage class. As another example, subdivided channels may be supported based on subdivided pathloss values or channel gain values in a coverage class. To this end, each terminal measures a signal of a related channel received from a base station, for example, a PDCCH signal, and reports, to a base station, a preferred channel selected based on a channel gain value and a pathloss value for each channel.

2-3) randomly select a channel from among channels for each coverage class

A channel is distinguished based on a terminal ID and is selected. That is, a channel is selected based on a remainder obtained by performing a remainder operation with respect to a terminal ID, or operation may be performed based on a number of an nth digit.

To this end, each terminal reports a selected preferred channel to a base station, or selects a channel based on a terminal ID of which the base station is aware and reports the same to the base station.

2-4) select a channel by changing the number of allocated channels to be different for each coverage class A larger number of channels is allocated to a higher coverage class, and a smaller number of channels is allocated to a lower coverage class. When the number of coverage classes is 3 and the number of control channels allocated is 6, the number of control channels of coverage class 1 is 1, the number of control channels of coverage class 2 is 2, and the number of control channels of coverage class 3 is 3. This is an example of the method of allocating channels. This may be changed depending on the traffic load, the number of repetitions, and the amount of resources allocated to each coverage class. To this end, each terminal may inform a base station of allocation assistance information, or may select a channel based on information that the base station is aware of, for example, the number of terminals for each coverage class, the amount of traffic demanded, or the like.

Figure 8:
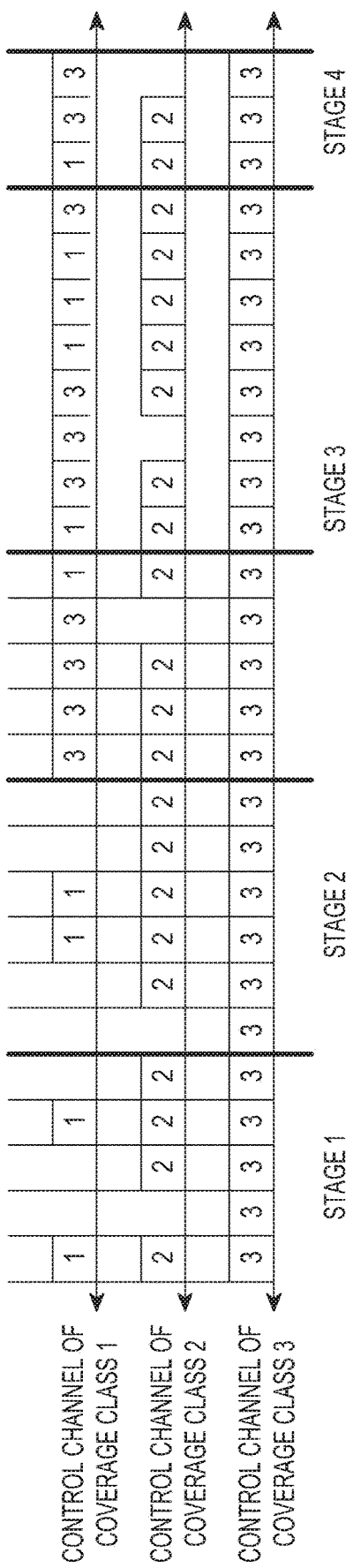
FIG. 8 is a diagram illustrating an example of distributing a channel allocated to an underloaded coverage class to a terminal belonging to an overloaded coverage class in a communication system according to an embodiment of the present disclosure.

FIG. 8 is a diagram illustrating an example of distribution of a channel allocated to an underloaded coverage class to a terminal belonging to an overloaded coverage class in a communication system according to an embodiment of the present=disclosure.

Referring to FIG. 8, assuming that a control channel of coverage class 1 is used by terminal 1, a control channel of coverage class 2 is used by terminal 2, and a control channel of coverage class 3 is used by terminal 3, as illustrated in the drawing, a base station determines whether each coverage class is overloaded or underloaded in stage 1.

In stage 2, the base station selects a terminal which is to be handed over to an underloaded coverage class from among terminals belonging to an overloaded coverage class. In stage 3, the selected terminal, that is, terminal 3, uses the control channel of coverage class 1. Subsequently, the period of application time of the operation in which terminal 3 uses the control channel of coverage class 1 is gradually increased.

In stage 4, when the underloaded coverage class becomes overloaded, the base station manages the load of the coverage class by reducing the application time, as illustrated in the drawing.

Figure 9:
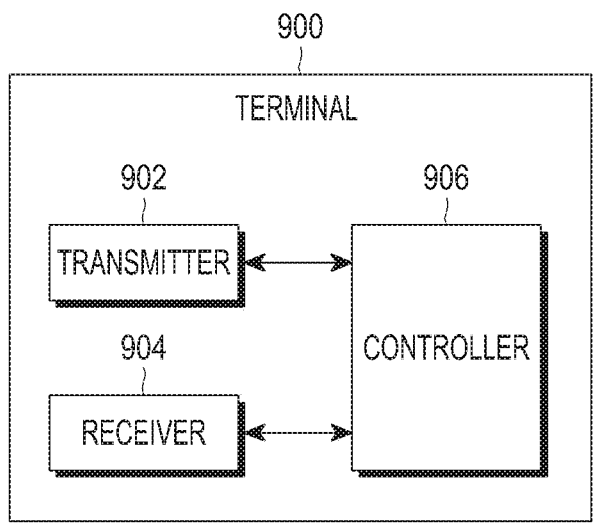
FIG. 9 is a diagram illustrating the configuration of a terminal that transmits and receives a signal based on a coverage class in a communication system according to an embodiment of the present disclosure.

FIG. 9 is a diagram illustrating the configuration of a terminal that transmits and receives a signal based on a coverage class in a communication system according to an embodiment of the present disclosure.

Referring to FIG. 9, a terminal 900 may include a transmitter 902, a receiver 904, and a controller 906.

The controller 906 controls the operation of the terminal 900. Particularly, the controller 906 may perform control so that the terminal 900 performs operations related to an operation of transmitting and receiving a signal based on a coverage class according to an embodiment of the present disclosure. Here, the operation of transmitting and receiving a signal based on a coverage class has been described with reference to FIGS. 2 to 8, and thus, detailed descriptions thereof will be omitted.

The transmitter 902 transmits various messages under the control of the controller 906. Here, various messages that the transmitter 902 transmits have been described with reference to FIGS. 2 to 8, and thus detailed descriptions thereof will be omitted.

The receiver 904 receives various messages under the control of the controller 906. Here, the various messages that the receiver 904 receives have been described with reference to FIGS. 2 to 8, and thus detailed descriptions thereof will be omitted.

Figure 10:
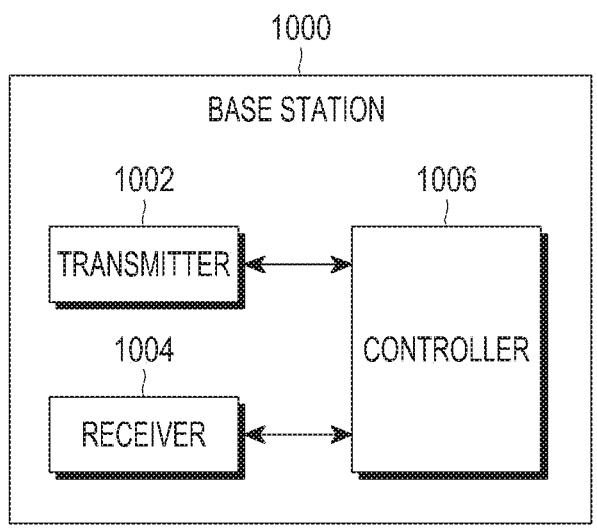
FIG. 10 is a diagram illustrating the configuration of a base station that transmits and receives a signal based on a coverage class in a communication system according to an embodiment of the present disclosure.

FIG. 10 is a diagram illustrating the configuration of a base station that transmits and receives a signal based on a coverage class in a communication system according to an embodiment of the present disclosure.

Referring to FIG. 10, a base station 1000 may include a transmitter 1002, a receiver 1004, and a controller 1006.

The controller 1006 controls the operation of the base station 1000. Particularly, the controller 1006 may perform control so that the base station 1000 performs operations related to an operation of transmitting and receiving a signal based on a coverage class according to an embodiment of the present disclosure. Here, the operation of transmitting and receiving a signal based on a coverage class has been described with reference to FIGS. 2 to 8, and thus, detailed descriptions thereof will be omitted.

The transmitter 1002 transmits various messages under the control of the controller 1006. Here, the various messages that the transmitter 1002 transmits have been described with reference to FIGS. 2 to 8, and thus detailed descriptions thereof will be omitted.

The receiver 1004 receives various messages under the control of the controller 1006. Here, the various messages that the receiver 1004 receives have been described with reference to FIGS. 2 to 8, and thus detailed descriptions thereof will be omitted.

Particular aspects of the present disclosure may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a compact disk-read only memory (CD-ROM), a magnetic tape, a floppy disk, an optical data storage device, and a carrier wave (such as data transmission over the Internet). The computer-readable recording medium may be distributed through computer systems connected to the network, and accordingly the computer-readable code is stored and executed in a distributed manner. Further, functional programs, codes and code segments to attain the present disclosure may be easily interpreted by skilled programmers in the art to which the present disclosure pertains.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a compact discs (CD), a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of communicating with a base station based on a mobility coverage class by a terminal in a communication system, the method comprising:

receiving, from the base station, configuration information including first information used for estimating mobility of the terminal;

determining whether the terminal has the mobility required for entering a mobility mode based on the first information used for estimating the mobility of the terminal;

entering the mobility mode in which a predetermined coverage class in a normal mode is switched to the mobility coverage class in the mobility mode in case that it is determined that the terminal has the mobility;

transmitting, to the base station, a mobility mode indicator indicating entry into the mobility mode;

selecting one of coverage classes of the base station as the mobility coverage class; and communicating with the base station using a resource allocated to the terminal based on the selected mobility coverage class, wherein the communicating with the base station using the resource allocated to the terminal based on the selected mobility coverage class comprises:

receiving a paging message transmitted from the base station using the resource allocated to the terminal based on the mobility coverage class, and transmitting a paging response message in response to the paging message using the resource allocated to the terminal based on the mobility coverage class.

2. The method of claim 1, wherein the configuration information further includes second information used for determining whether to return to the normal mode in which the predetermined coverage class is applied, further comprising:

determining whether to return to the normal mode in which the predetermined coverage class is applied based on the second information used for determining whether to return to the normal mode;

transmitting a normal mode indicator indicating return to the normal mode to the base station when it is determined to return to the normal mode;

entering the normal mode; and communicating with the base station using a resource allocated to the terminal based on the predetermined coverage class.

3. The method as claimed in claim 2, wherein the determining whether to return to the normal mode comprises at least one of:

a first option of determining whether a currently measured coverage class value is higher than a value of the mobility coverage class;

a second option of determining whether a difference between a coverage class value measured during a predetermined period of time and the mobility coverage class value is greater than or equal to a predetermined threshold value and whether the difference is repeated at least a predetermined number of times;

a third option of determining whether an error is detected in a reception operation of the terminal during the predetermined period of time;

a fourth option of determining whether a reception quality value of a serving cell measured during by the terminal the predetermined period of time is less than or equal to or greater than or equal to a predetermined threshold value;

a fifth option of performing the determination based on a determination made by the base station; or a sixth option of performing the determination based on a combination of the first option to the fifth option.

4. The method of claim 1, wherein the determining of whether the terminal has the mobility comprises at least one of:

a first option of performing the determination by comparing a number of times that the terminal updates a coverage class during a predetermined period of time with a predetermined threshold value;

a second option of performing the determination by comparing a number of times that the terminal reselects a cell during the predetermined period of time with a predetermined threshold value;

a third option of performing the determination by comparing a variation of a coverage class of the terminal or a variation of a measured signal quality during the predetermined period of time with a predetermined threshold value;

a fourth option of performing the determination by comparing a variation of at least one value of statistical values associated with the terminal during the predetermined period of time with a predetermined threshold;

a fifth option of performing the determination based on at least one of a service scenario of the terminal, a request of the terminal, or a configuration by the base station; or a sixth option of performing the determination based on a combination of the first option to the fifth option.

5. The method of claim 1, wherein the selecting of one of the coverage classes of the base station as the mobility coverage class comprises at least one of:

a first option of performing the selection based on at least one of an average value, a maximum value, or other operation values of coverage class values applied to the terminal during a predetermined period of time;

a second option of performing the selection based on a maximum value of signal quality values measured by the terminal during the predetermined period of time or a sum of the maximum value and a predetermined margin value;

a third option of performing the selection based on a value set by the base station; or a fourth option of performing the selection based on a combination of the first option to the third option.

6. The method of claim 1, wherein the terminal is in a connected state.

7. The method of claim 1, wherein the terminal is in an idle state.

8. The method of claim 1, wherein the mobility coverage class is selected from among coverage classes which distinguish a base station coverage based on a pathloss value of a reference signal.

9. The method of claim 1, wherein paging resource allocation information for the terminal is changed based on the mobility coverage class.

10. The method of claim 1, wherein the first information includes criteria for determining whether the terminal has the mobility and threshold values to be respectively compared with the criteria; and wherein a second information includes criteria for determining whether the terminal needs to return to the normal mode and threshold values to be respectively compared with the criteria.

11. A terminal for communicating with a base station based on a mobility coverage class, the terminal comprising:

a transceiver; and at least one processor configured to:

control the transceiver to receive, from the base station, configuration information including first information used for estimating mobility of the terminal, determine whether the terminal has the mobility required for entering a mobility mode based on the first information used for estimating the mobility of the terminal, enter the mobility mode in which a predetermined coverage class in a normal mode is switched to the mobility coverage class in the mobility mode in case that it is determined that the terminal has the mobility, control the transceiver to transmit, to the base station, a mobility mode indicator indicating entry into the mobility mode, select one of coverage classes of the base station as the mobility coverage class, and control the transceiver to communicate with the base station using a resource allocated to the terminal based on the selected mobility coverage class, wherein the at least one processor is further configured to:

control the transceiver to receive a paging message transmitted from the base station using the resource allocated to the terminal based on the mobility coverage class, and transmit a paging response message in response to the paging message using the resource allocated to the terminal based on the mobility coverage class.

12. The terminal of claim 11, wherein the configuration information further includes second information used for determining whether to return to the normal mode in which the predetermined coverage class is applied, and wherein the at least one processor is further configured to:

determine whether to return to the normal mode in which the predetermined coverage class is applied based on the second information used for determining whether to return to the normal mode, control the transceiver to transmit a normal mode indicator indicating return to the normal mode to the base station when it is determined to return to the normal mode, enter the normal mode, and control the transceiver to communicate with the base station using a resource allocated to the terminal based on the predetermined coverage class.

13. The terminal of claim 12, wherein the at least one processor is further configured to:
   determine whether to return to the normal mode comprises at least one of:
      a first option of determining whether a currently measured coverage class value is higher than a value of the mobility coverage class;
      a second option of determining whether a difference between a coverage class value measured during a predetermined period of time and the mobility coverage class value is greater than or equal to a predetermined threshold value and whether the difference is repeated at least a predetermined number of times;
      a third option of determining whether an error is detected in a reception operation of the terminal during the predetermined period of time;
      a fourth option of determining whether a reception quality value of a serving cell measured during by the terminal the predetermined period of time is less than or equal to or greater than or equal to a predetermined threshold value;
      a fifth option of performing the determination based on a determination made by the base station; or
      a sixth option of performing the determination based on a combination of the first option to the fifth option.

14. A terminal of claim 11, wherein the at least one processor is further configured to:
   determine whether the terminal has the mobility comprises at least one of:
      a first option of performing the determination by comparing a number of times that the terminal updates a coverage class during a predetermined period of time with a predetermined threshold value,
      a second option of performing the determination by comparing a number of times that the terminal reselects a cell during the predetermined period of time with a predetermined threshold value,
      a third option of performing the determination by comparing a variation of a coverage class of the terminal or a variation of a measured signal quality during the predetermined period of time with a predetermined threshold value,
      a fourth option of performing the determination by comparing a variation of at least one value of statistical values associated with the terminal during the predetermined period of time with a predetermined threshold,
      a fifth option of performing the determination based on at least one of a service scenario of the terminal, a request of the terminal, or a configuration by the base station, or
      a sixth option of performing the determination based on a combination of the first option to the fifth option.

15. The terminal of claim 11, wherein the at least one processor is further configured to:
   select one of the coverage classes of the base station as the mobility coverage class comprises at least one of:
      a first option of performing the selection based on at least one of an average value, a maximum value, or other operation values of coverage class values applied to the terminal during a predetermined period of time;
      a second option of performing the selection based on a maximum value of signal quality values measured by the terminal during the predetermined period of time or a sum of the maximum value and a predetermined margin value;
      a third option of performing the selection based on a value set by the base station; or
      a fourth option of performing the selection based on a combination of the first option to the third option.

16. The terminal of claim 11, wherein the terminal is in a connected state.

17. The terminal of claim 11, wherein the terminal is in an idle state.

18. The terminal of claim 11, wherein the mobility coverage class is selected from among coverage classes which distinguish a base station coverage based on a pathloss value of a reference signal.

19. The terminal of claim 11,
   wherein the first information includes criteria for determining whether the terminal has the mobility and threshold values to be respectively compared with the criteria; and
   wherein a second information includes criteria for determining whether the terminal needs to return to the normal mode and threshold values to be respectively compared with the criteria.

* * * * *